(12) United States Patent
Kossett et al.

(10) Patent No.: US 12,194,824 B2
(45) Date of Patent: Jan. 14, 2025

(54) TWO WHEEL ROBOT WITH CONVERTIBILITY AND ACCESSORIES

(71) Applicant: ReconRobotics, Inc., Edina, MN (US)

(72) Inventors: Alex J. Kossett, Minnetonka, MN (US); Andrew Drenner, Savage, MN (US); Luke William Bromback, Minneapolis, MN (US); Collin LaFave, Ellsworth, WI (US)

(73) Assignee: ReconRobotics, Inc., Edina, MN (US)

( * ) Notice: Subject to any disclaimer, the term of this patent is extended or adjusted under 35 U.S.C. 154(b) by 225 days.

(21) Appl. No.: 17/747,836

(22) Filed: May 18, 2022

(65) Prior Publication Data

US 2022/0348064 A1 Nov. 3, 2022

Related U.S. Application Data

(63) Continuation-in-part of application No. PCT/US2020/061137, filed on Nov. 18, 2020, and a
(Continued)

(51) Int. Cl.
*F41H 7/00* (2006.01)
*B60K 1/02* (2006.01)
*G05D 1/00* (2006.01)

(52) U.S. Cl.
CPC .............. *B60K 1/02* (2013.01); *F41H 7/005* (2013.01); *G05D 1/0016* (2013.01); *G05D 1/0094* (2013.01)

(58) Field of Classification Search
CPC ........ B60K 1/02; F41H 7/005; G05D 1/0016; G05D 1/0094
See application file for complete search history.

(56) References Cited

U.S. PATENT DOCUMENTS 1,408,885 A 3/1922 Humphrey
2,818,301 A 12/1957 Joseph
(Continued)

FOREIGN PATENT DOCUMENTS

CN 202138435 U 2/2012
CN 203266631 U 11/2013
(Continued)

OTHER PUBLICATIONS

International Search Report for Application No. PCT/US2018/000161 dated Dec. 14, 2018, 19 pgs.
(Continued)

*Primary Examiner* — Jacob B Meyer
(74) *Attorney, Agent, or Firm* — Christensen, Fonder, Dardi & Herbert PLLC; Douglas J. Christensen

(57) ABSTRACT

A two wheeled throwable robot with a pair of motorized wheels mounted on each end of an elongate body and a rearwardly extending tail. The body comprising a chassis with an accessory mounting interface on top side and rearward side. A backpack accessory providing active sensing or environmental effects has an inverted L-shape when viewed from an end and attaches to the rearward side of the elongate body and extends over the topside of the body. The stabilizing tail for the two wheeled robot attaches to a rearward surface of the backpack accessory. The robot and backpack accessory have impact protection means when the robot is thrown. The backpack accessory may be within a zone of protection defined by the maximum deflection of the wheels or may have elastomeric bumpers when the accessory backpack projects out of the zone of protection.

20 Claims, 20 Drawing Sheets

Related U.S. Application Data continuation-in-part of application No. 17/094,709, filed on Nov. 10, 2020, now Pat. No. 11,479,102, which is a continuation of application No. 16/736,519, filed on Jan. 7, 2020, now Pat. No. 10,828,973, which is a continuation-in-part of application No. 15/998,837, filed on Aug. 15, 2018, now Pat. No. 10,526,029.

(60) Provisional application No. 62/936,963, filed on Nov. 18, 2019, provisional application No. 62/545,902, filed on Aug. 15, 2017.

(56) References Cited

U.S. PATENT DOCUMENTS

| | | | |
|---|---|---|---|
| 4,061,199 A | 12/1977 | Last | |
| 4,300,308 A | 11/1981 | Ikeda | |
| 4,334,221 A | 6/1982 | Rosenhagen et al. | |
| 4,402,158 A | 9/1983 | Seki et al. | |
| 4,406,085 A | 9/1983 | Rhodes | |
| 4,443,968 A | 4/1984 | Law | |
| 4,572,530 A | 2/1986 | Marino | |
| 4,575,304 A | 3/1986 | Nakagawa et al. | |
| 4,648,853 A | 3/1987 | Siegfried | |
| 4,736,826 A | 4/1988 | White et al. | |
| 4,773,889 A | 9/1988 | Rosenwinkel et al. | |
| 4,899,945 A | 2/1990 | Jones | |
| 4,906,051 A | 3/1990 | Vilhauer, Jr. | |
| 4,913,458 A | 4/1990 | Hamilton | |
| 4,993,912 A | 2/1991 | King et al. | |
| 5,085,062 A | 2/1992 | Capdevila | |
| 5,129,709 A | 7/1992 | Klamer | |
| D338,474 S | 8/1993 | Christensen | |
| 5,241,380 A | 8/1993 | Benson et al. | |
| 5,350,033 A | 9/1994 | Kraft | |
| 5,473,364 A | 12/1995 | Burt | |
| 5,487,692 A | 1/1996 | Mowrer et al. | |
| 5,551,545 A | 9/1996 | Gelfman | |
| 5,554,914 A | 9/1996 | Miyazawa | |
| 5,576,605 A | 11/1996 | Miyazawa | |
| 5,596,255 A | 1/1997 | Miyazawa | |
| 5,610,488 A | 3/1997 | Miyazawa | |
| 5,721,691 A | 2/1998 | Wuller et al. | |
| 5,732,074 A | 3/1998 | Spaur et al. | |
| 5,759,083 A | 6/1998 | Polumbaum et al. | |
| 5,762,533 A | 6/1998 | Tilbor et al. | |
| 5,781,005 A | 7/1998 | Vig et al. | |
| 5,839,795 A | 11/1998 | Matsuda et al. | |
| 5,871,386 A | 2/1999 | Bart et al. | |
| 5,888,135 A | 3/1999 | Barton, Jr. et al. | |
| 5,908,454 A | 6/1999 | Zyburt et al. | |
| 6,046,565 A | 4/2000 | Thorne | |
| 6,066,026 A | 5/2000 | Bart et al. | |
| 6,101,951 A | 8/2000 | Sigel | |
| 6,109,568 A | 8/2000 | Gilbert et al. | |
| 6,199,880 B1 | 3/2001 | Favorito et al. | |
| 6,313,724 B1 | 11/2001 | Osterweil | |
| 6,322,088 B1 | 11/2001 | Klamer et al. | |
| 6,502,657 B2 | 1/2003 | Kerrebrock et al. | |
| 6,548,982 B1 | 4/2003 | Papanikolopoulos et al. | |
| 6,574,536 B1 | 6/2003 | Kawagoe et al. | |
| 6,824,508 B2 | 11/2004 | Kim et al. | |
| 6,860,346 B2* | 3/2005 | Burt | B62D 57/028 180/218 |
| 6,902,464 B1 | 6/2005 | Lee | |
| D540,503 S | 4/2007 | Tsang | |
| 7,249,640 B2 | 7/2007 | Horchler et al. | |
| D584,366 S | 1/2009 | Bowen et al. | |
| 7,559,385 B1* | 7/2009 | Burt | B60K 7/0007 901/1 |
| D626,577 S * | 11/2010 | Carlson | D15/199 |
| D637,217 S * | 5/2011 | Carlson | D15/199 |
| 8,172,966 B2 | 5/2012 | Blau et al. | |
| 8,186,469 B2 | 5/2012 | Yim et al. | |
| 8,197,298 B2* | 6/2012 | Willett | A63H 33/003 446/470 |
| 8,342,440 B2* | 1/2013 | Papanikolopoulos | A63H 27/12 244/17.11 |
| 8,496,077 B2 | 7/2013 | Nesnas et al. | |
| 8,505,667 B2 | 8/2013 | Kim et al. | |
| 8,636,096 B2 | 1/2014 | Kim et al. | |
| 8,720,614 B2* | 5/2014 | Nesnas | B62D 21/04 180/21 |
| 8,776,977 B2 | 7/2014 | Lansberry et al. | |
| 8,884,763 B2 | 11/2014 | Hudson et al. | |
| 9,020,639 B2 | 4/2015 | Bewley et al. | |
| 9,061,544 B2* | 6/2015 | Carlson | B25J 19/023 |
| 9,557,740 B2 | 1/2017 | Crawley | |
| 9,726,466 B2 | 8/2017 | Naud et al. | |
| 9,733,720 B2 | 8/2017 | Kavli et al. | |
| 10,046,819 B1* | 8/2018 | Sellner | B62D 57/00 |
| 10,124,483 B1* | 11/2018 | Cotton | H02K 7/1876 |
| 10,139,203 B1 | 11/2018 | Teal | |
| 10,494,314 B2 | 12/2019 | Blau et al. | |
| 10,526,029 B2 | 1/2020 | Kossett et al. | |
| 10,828,973 B2 | 11/2020 | Kossett et al. | |
| 11,479,102 B2 | 10/2022 | Kossett et al. | |
| 2003/0038607 A1 | 2/2003 | Yim et al. | |
| 2003/0092964 A1 | 5/2003 | Kim et al. | |
| 2003/0137268 A1* | 7/2003 | Papanikolopoulos | B62D 57/02 318/568.11 |
| 2004/0000439 A1* | 1/2004 | Burt | B60B 19/04 180/7.1 |
| 2008/0006171 A1 | 1/2008 | Confer | |
| 2008/0143065 A1 | 6/2008 | DeFazio et al. | |
| 2009/0099709 A1 | 4/2009 | Troy | |
| 2010/0032224 A1 | 2/2010 | Liu | |
| 2010/0152922 A1* | 6/2010 | Carlson | B60B 9/10 180/218 |
| 2010/0318059 A1 | 12/2010 | Farritor et al. | |
| 2011/0139923 A1* | 6/2011 | Papanikolopoulos | B64C 39/028 244/2 |
| 2012/0059520 A1* | 3/2012 | Kossett | B60B 15/02 180/65.6 |
| 2012/0073930 A1 | 3/2012 | Lansberry et al. | |
| 2012/0137862 A1* | 6/2012 | Kossett | F41H 11/16 89/1.13 |
| 2012/0185093 A1 | 7/2012 | Kossett et al. | |
| 2012/0273284 A1 | 11/2012 | Nesnas et al. | |
| 2014/0208976 A1 | 7/2014 | Jung et al. | |
| 2014/0224560 A1* | 8/2014 | Carlson | B25J 5/007 180/218 |
| 2015/0012163 A1 | 1/2015 | Crawley | |
| 2015/0175292 A1 | 6/2015 | MacGregor et al. | |
| 2015/0306764 A1 | 10/2015 | Goldenberg et al. | |
| 2016/0144517 A1* | 5/2016 | Carlson | B25J 5/007 180/218 |
| 2018/0290312 A1* | 10/2018 | Carlson | B25J 5/007 |
| 2019/0002045 A1* | 1/2019 | Sellner | B60K 17/043 |
| 2019/0054633 A1* | 2/2019 | Kossett | B60K 1/04 |
| 2019/0054641 A1* | 2/2019 | Kossett | G07C 9/00174 |
| 2019/0092406 A1* | 3/2019 | Kossett | F41H 7/005 |
| 2020/0254863 A1 | 8/2020 | Kossett et al. | |
| 2020/0333119 A1 | 10/2020 | Caldwell | |
| 2021/0170851 A1 | 6/2021 | Kossett et al. | |
| 2022/0348064 A1* | 11/2022 | Kossett | B60K 1/02 |

FOREIGN PATENT DOCUMENTS

| | | |
|---|---|---|
| CN | 104228998 A | 12/2014 |
| CN | 204077847 U | 1/2015 |
| CN | 106002915 A | 10/2016 |
| CN | 104802588 B | 1/2017 |
| EP | 1870254 A1 | 12/2007 |
| EP | 2735497 A1 | 5/2014 |
| FR | 2567078 A1 | 1/1986 |
| JP | H08269701 A | 10/1996 |
| JP | H1069314 A | 3/1998 |
| KR | 1020110139912 A | 12/2011 |
| KR | 101184023 | 9/2012 |

(56) References Cited

FOREIGN PATENT DOCUMENTS

| KR | 101217846 | | 1/2013 | |
|----|-----------|---|--------|---|
| KR | 101226261 | | 1/2013 | |
| KR | 1020140097709 | A | 8/2014 | |
| RU | 89837 | U1 | 12/2009 | |
| WO | WO2002024417 | A2 | 3/2002 | |
| WO | WO2010030055 | A1 | 3/2010 | |
| WO | WO-2013059512 | A2 * | 4/2013 | ............... H01Q 1/12 |
| WO | WO-2013059513 | A1 * | 4/2013 | ............. F41H 7/005 |
| WO | WO-2013059515 | A1 * | 4/2013 | ............. B25J 5/007 |
| WO | WO-2013059519 | A1 * | 4/2013 | ............. B25J 5/007 |
| WO | WO-2013071296 | A1 * | 5/2013 | ........... B23D 29/002 |
| WO | WO2013103171 | A1 | 7/2013 | |
| WO | WO-2019035894 | A1 * | 2/2019 | ......... B60R 16/0231 |
| WO | WO-2021102060 | A1 * | 5/2021 | ............ B25J 11/002 |

OTHER PUBLICATIONS

International Search Report for Application No. PCT/US2018/000182 dated Jan. 3, 2019, 16 pgs.
International Search Report for Application No. PCT/US2018/000198 dated Dec. 17, 2018, 12 pgs.
International Search Report for Application No. PCT/US2020/061137, dated Mar. 26, 2021, 5 pages.
Supplementary Partial European Search Report for U.S. Appl. No. 18/845,800, dated Jul. 9, 2021, 9 pages.

* cited by examiner

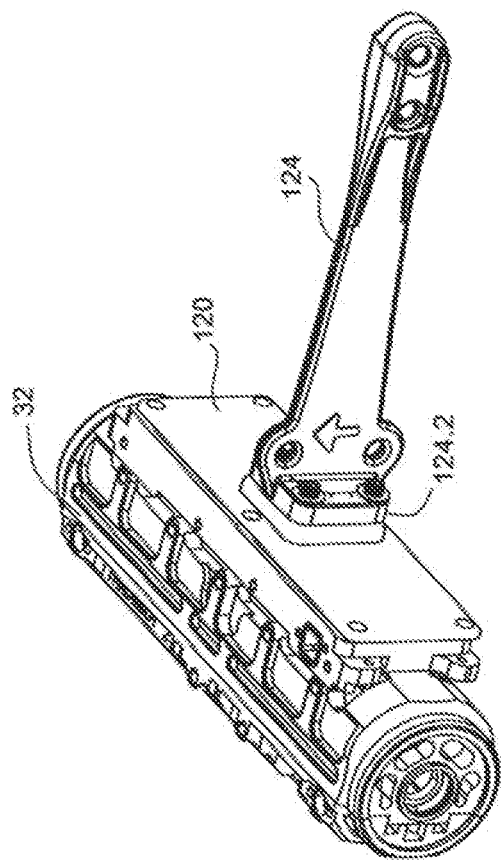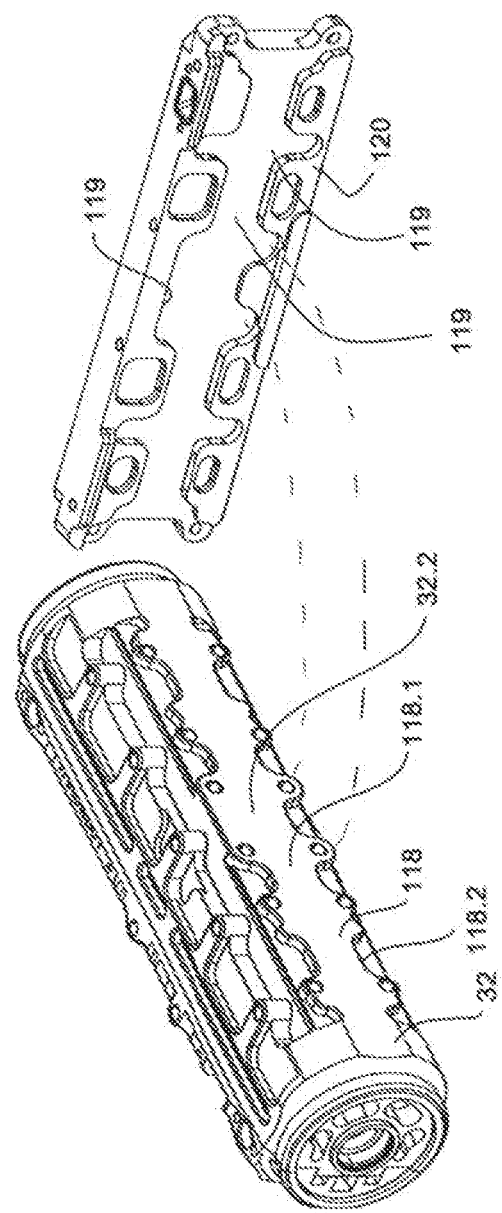

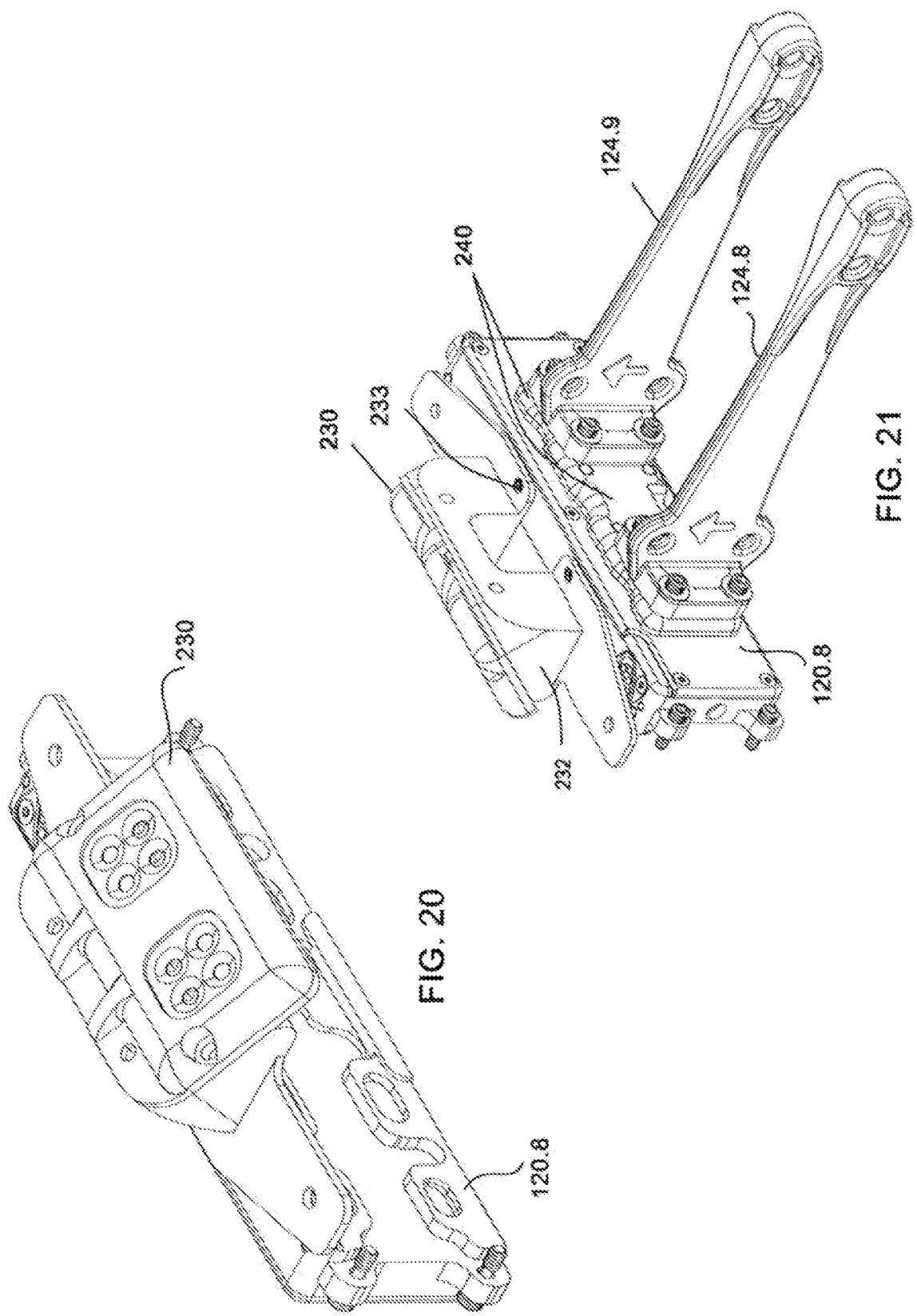

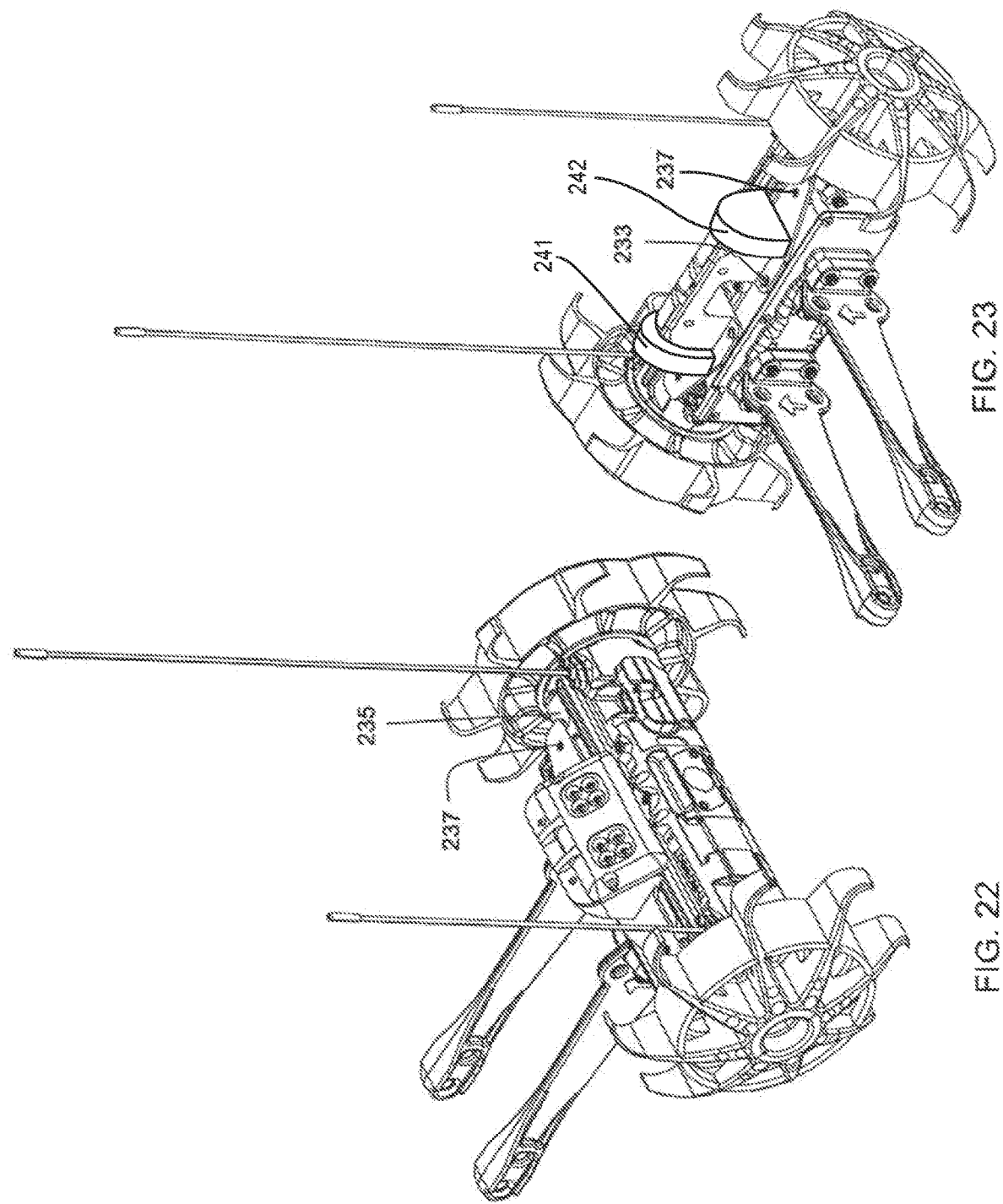

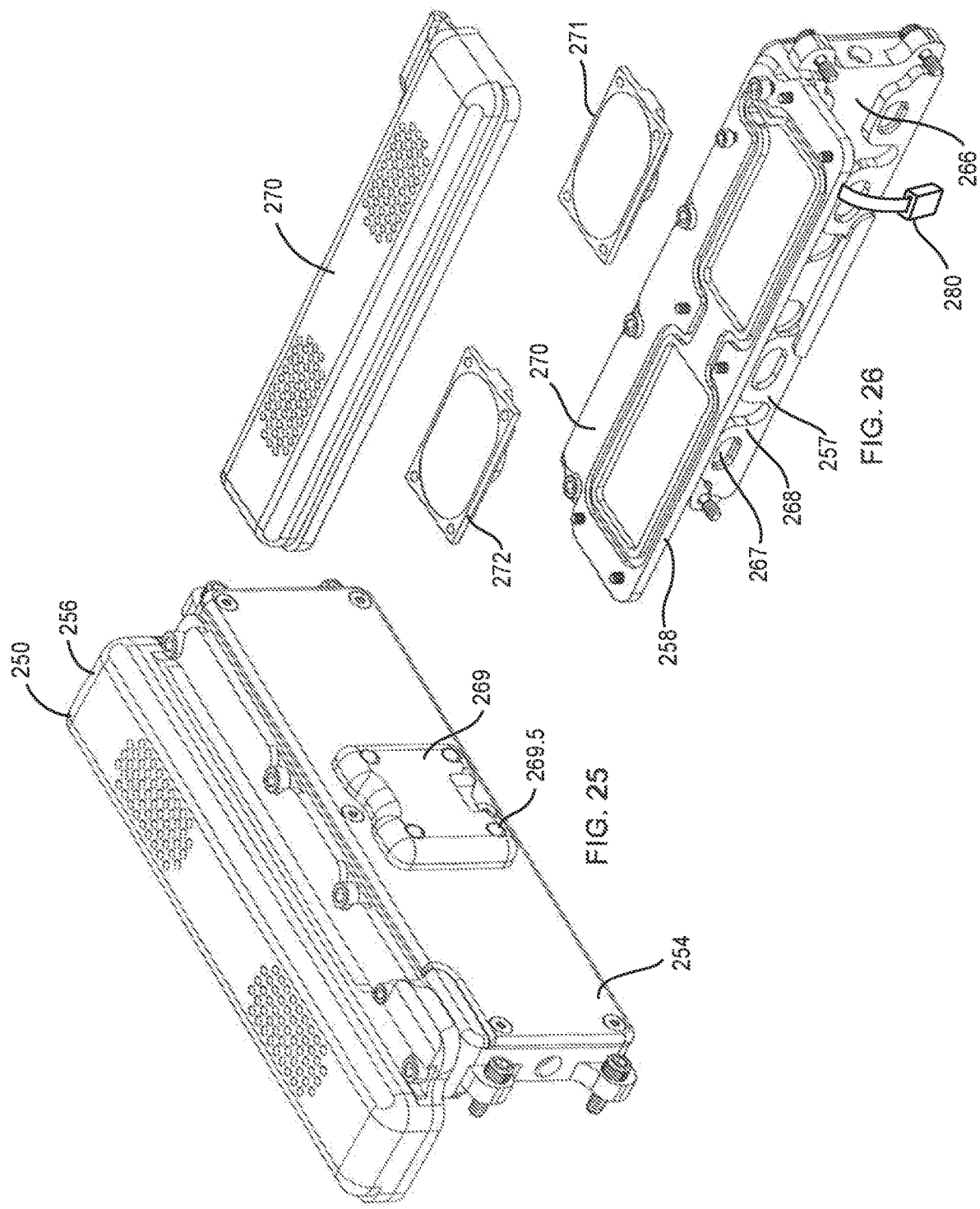

TWO WHEEL ROBOT WITH CONVERTIBILITY AND ACCESSORIES

CROSS-REFERENCE TO RELATED APPLICATION

The application claims priority to and is a Continuation-In-Part of International Patent Application No. PCT/US20/61137, filed Nov. 18, 2020, which claims the benefit of U.S. Provisional Application 62/936,963 filed Nov. 18, 2019, the contents of which is incorporated herein by reference.

This application is also a continuation-in-part of U.S. patent application Ser. No. 17/094,709, filed Nov. 10, 2020, which is a continuation of U.S. patent application Ser. No. 16/736,519 filed Jan. 7, 2020, now U.S. Pat. No. 10,828,973, which claims priority to U.S. Provisional App. No. 62/936,963 filed Nov. 18, 2019. U.S. patent application Ser. No. 16/736,519, also claims priority to and is a continuation-in-part of U.S. patent application Ser. No. 15/998,837 filed Aug. 15, 2018, now U.S. Pat. No. 10,526,029. U.S. patent application Ser. No. 15/998,837 filed Aug. 15, 2018, claims priority to U.S. Provisional App. No. 62/545,902, filed Aug. 15, 2017. The contents of which are incorporated by reference herein for all purposes.

BACKGROUND OF THE INVENTION

Throwable robots used in military and policing operations need to be robust and able to survive exposure to rugged conditions including exposure to dirt and water and large vertical drops. Providing modularity and flexibility in attaching useful accessories that may be securely attached thereto and that would be protected from damage during use would be welcome by users. The interchangeability of accessories is of particular interest to military and law enforcement personnel as this allows a single robot to be reconfigured to meet certain mission specific needs. Any improvements in adding functionalities, reliability and performance for robots used in high stakes military and police operations are desirable. In particular, improvements in protecting accessories attached to throwable robots, would be well received by users of such robots.

SUMMARY OF THE INVENTION

A combination throwable two wheeled robot with one or more removable accessory packs provide functional options for the robot that may be swapped out in the field by users. In embodiments, the one or more accessory packs are protected from damage upon impacts resulting from throws or drops by way of utilizing existing features and the geometries of such two wheeled robot and specific features, configurations of the accessories. The accessory, configured as a backpack attachable to the robot, may be secured to the body of the robot where the tail would conventionally be, with the tail then secured to the backpack. In embodiments the accessory may protected from direct impacts when thrown by being positioned within a protected zone or envelope defined by the maximum deflection of the wheels. Additionally, the protected zone may be provided by the rearward projecting tail and its resistance to deflection upon impact. In embodiments, where the accessory protrudes beyond the zone of impact, an elastomeric bumper may be provided to the projection such that the elastomeric material absorbs the shock of impact rather than the accessory.

Known throwable two wheeled robots have an elongate body defining a chassis extending between and supporting a pair of drive wheels and further having a ground engaging tail extending rearwardly from the elongate body. Control circuitry, power circuitry, motors, drive trains, transceivers, cameras may all be located in the elongate body and thereby are protected by the compressible and resilient wheels and the integrity of the elongate body. In certain of such robots, the wheels may be compressed due to impacts from throwing or falls a limited amount, the elongate body is sized such maximum deflection or compression of the wheels upon a flat surface does not allow contact of the elongate body with the impact surface as clearance is provided between the maximum deflection point of the pair of wheels and the elongate body from impacts with flat surfaces. The space between the elongate body and the maximum deflection of the wheels provides a zone of protection to the accessories. The inventors have identified that impacts on accessories mounted to the robot that extend beyond the zone of protection, can directly damage the robot as well as the accessory. In embodiments, where the accessory protrudes beyond the zone of protection, an elastomeric bumper may be added. In embodiments, the accessory may have an elastomeric member sandwiched between the accessory and the elongate body, providing further protection to the robot.

The accessory packs may include a backpack containment that may be mountable on the chassis of the robot. In embodiments, the backpack unit defines a cavity that is covered by a cover. Suitable components are located in the backpack cavity dependent upon the functionalities of the backpack. The components including circuitry, the circuitry may be connected to circuitry in the elongate body by way of cables and connectors such as a USB connector. The accessory may then have an additional externally accessible USB connector. Such a connector may be a power port or a port for charging the robot or batteries in the accessory. In embodiments, the robot includes a tail having a mounting portion that is mountable to either a landing portion of the backpack or a landing portion of the robot chassis. In embodiments, when the backpack unit is placed on a rearward side of the body of the robot without the tail on the robot, before the backpack is secured with threaded fasteners attaching the backpack unit to the robot, the backpack unit has one degree of freedom of motion relative to robot, the one degree of freedom allowing the backpack unit to be pulled outwardly away from the robot. In embodiments, on an end view, both sides of the accessory may be simultaneously separated from the robot in a single outward direction. In embodiments, on an end view, one side of the accessory may be positioned in an undercut region such that the other side of the accessory is rotated outwardly about the one side before the one side may be separated.

In embodiments, each of the wheels have an undeflected radius, and each wheel is deflectable upon impact when thrown to a maximum deflected or deformed radius defining generally a cylindrical envelope and wherein the space between the elongate body and the outer periphery of the cylindrical envelope defining an annular accessory mounting space. In embodiments, the backpack unit is entirely within the annular accessory mounting space, when the robot interfacing portion of the backpack body is mated with the landing portion of the chassis and the tail interfacing portion of the backpack body is mated with mounting portion of the tail. In embodiments, the backpack body extends rearwardly from the robot chassis and the tail extends rearwardly from the backpack. In embodiments, the tail providing an additional protective envelope portion continuous with the accessory mounting space in that the tail has rigidity that precludes both wheels from simultaneously contacting or fully compressing to the maximum deflection level when the impact is on the tail side of the robot impacting a flat.

In embodiments, the body has four sides, a top side, a bottom side, a rearward side, and a forward side. The body comprising a chassis with sidewalls and exterior sidewall surfaces and providing an accessory mounting interface. The chassis having a side with a planar landing having a matrixical arrangement of threaded holes. The landing having an outwardly facing landing surface with hole openings at the landing surface. The landing having landing sides with sidewall surfaces extending in an inward direction for the landing. In embodiments, the landing with a planar landing surface has recesses therein spaced from the threaded holes. In embodiments the accessory mounting interface comprising at least two adjacent sides, each side having planar side surfaces with the planar surface on one of the two adjacent sides being perpendicular to the planar surface on the other of the two adjacent sides.

In embodiments, each of the at least two adjacent side surfaces have projections with outwardly facing landings, and the landings have a matrixical arrangement of threaded holes, the threaded holes extending toward the open interior but not into the open interior. In embodiments, the landing having a planar outwardly facing surface. The threaded holes being perpendicular to an outer surface of the landing. The projections having projection sidewall surfaces leading to the respective landing surface. The projections of each side being unitary with one of the chassis portions.

In embodiments, the accessory is attached within the cylindrical envelope. The accessory having mating projections that extend below the landing surfaces and are positioned to abut against projection sidewalls or positioned in recesses.

The accessory, when positioned on the exterior surface of the robot, may have a single degree of freedom. In embodiments the single degree of freedom is in the same direction as the axis of at least on threaded hole. The accessory may be attached with a plurality of threaded fasteners extending inwardly and being within the cylindrical envelope. The accessory may have surfaces for abutting with the projection sidewall surfaces and/or for fitting into recesses on the respective sides of the robot.

In embodiments the projections have a landing with projection side walls, the projection defining a rail attachment portion aligned with the axis of the elongate body, in embodiments the rail having a dovetail cross-section. In embodiments the rail may be configured as a Picatinny rail extending in a direction from wheel to wheel. The accessory having a clamp for attachment to the rail. The projections being unitary with chassis portions, the chassis portions defining a chassis interior that secures therein at least one motor, at least one battery, radio and control circuitry.

In embodiments, the at least one landing having inwardly extending recesses for capturing portions of the accessory. The recesses extending inwardly in the same direction as the threaded holes.

In embodiments, a forwardly directed camera is supported by the robot body. In embodiments, a plurality of robot components are mounted in an open interior of the chassis. In embodiments, the plurality of components include at least one motor, a circuit board with processing circuitry, and a battery.

In embodiments, a throwable robot has only two motorized wheels supported by a body, the body comprising a housing with a matrixical arrangement of threaded holes extending into an exterior surface of the housing, the matrixical arrangement extending at least most of the distance between the two wheels. In embodiments, the matrixical arrangement has at least one row of threaded holes in alignment, the at least one row comprising at least four holes. In embodiments, the row comprises at least three holes in alignment. In embodiments, the matrixical arrangement comprises at least two rows of threaded holes, with adjacent pairs of holes having equal spacing between the holes. In embodiments, at least two adjacent sides each have a matrixical arrangement of holes. The threaded holes not extending through the walls of the housing thereby maintaining a watertight integrity of the enclosure. In embodiments, the entries of the threaded holes comprising the matrixical arrangement are coplanar.

A feature and advantage of embodiments is that a robot and accessory combination having a weight that allows the combination to be thrown over obstacles such as fences and/or walls. In embodiments, the robot and accessory combination has a weight of less than five pounds.

In embodiments, the wheels are separated from each other a distance between 5.0 and 7.0 inches. The matrixical arrangement of mounting holes for backpack accessories have a separation between adjacent holes of about 1.0 inches. In embodiments, the hole separation is 0.90 to 1.1 inches. In embodiments, the length of the backpack accessory that seats on the top and/or back side of the elongate body is between 4.5 inches and 5.75 inches. The attachment holes are separated by 1.0 inches or a multiple of 1.0 inches such that the holes mate with the accessory backpack mounting holes on the elongate chassis.

A feature and advantage of embodiments is that a robot and accessory combination with a level of impact resistance/shock absorbing that allows the robot to continue a mission after experiencing a significant drop, such as driving off a floor of a multiple story building dropping to a floor below. In embodiments, the robot and accessory is configured to experience a three story drop without loss of functionality. The maximum deflectibility of the wheels when the robot is dropped 30 feet can define the zone of protection or annular mounting space for accessories.

In embodiments, the robot and accessory combination has a thirty foot drop rating, indicating that the combination can be dropped a distance of thirty feet without damage. In embodiments, each of the wheels deflect to a maximum deflection in a radial direction when dropped from 30 feet, and wherein when each of the wheels deflect said maximum deflection, the chassis and payload do extend outwardly to or past said maximum deflection.

A feature and advantage of embodiments is that a robot with an accessory mounted thereto by threaded fasteners, such as screws, may be thrown and the accessory/robot interface distributes shear forces from impact of the robot with a floor or ground to abutting surfaces between the accessory and the robot rather than to the screws or threaded fasteners securing the accessory to the robot.

A feature and advantage of embodiments is that the matrixical arrangement of holes may be utilized for adjustable mounting accessories and portions of the robot. For example different tails may be utilized. And a specific tail may be mounted in different orientations to angularly position a forward facing fixed camera or accessory on the robot as desired. For example, the tail may be rotated 180 degrees to provide a different angle of viewing for a camera directed forwardly from the housing.

A feature and advantage of embodiments is a two wheeled robot having a chassis extending between two motorized radially deformable resilient wheels, and a tail extending rearwardly. The radially deformable resilient wheels having an undeformed radius, a flat surface operational deflection, and a maximum radial deformation on impact. The maximum radial deformation defining a cylindrical component protection envelope extending between the wheels. The flat surface operational deflection defining a cylindrical region and an obstacle clearance below the chassis. The two wheeled robot having with an integral accessory backpack assembly that is positioned on a top surface of the robot chassis and on a back side of the robot chassis. The integral accessory backpack assembly having an inverted L shape. In embodiments the chassis in cross section having a generally square shape with each of the top, bottom, front and back sidewalls having exterior planar surfaces. In embodiments the top sidewall and back sidewall having planar surfaces for mounting the L shaped accessory backpack assembly. The corner of the "L" positioned at an upper rear corner of the chassis. A feature and advantage of embodiments is that the mounting of the L shaped accessory backpack assembly on the top sidewall and back sidewall is such that it does not impede the clearance for obstacles below the chassis. A further feature and advantage is that optimal use of the component protection region is provided with the L-shaped integral accessory backpack assembly. In embodiments the component protection envelope is enlarged in a rearward direction by way of the tail extending from the upright leg of the L-shaped integral accessory backpack assembly, that is, the rearward portion of the backpack assembly. The tail having sufficient stiffness to preclude impact of the rearward components on the chassis with an impact surface. The tail and each wheel cooperating to extend the component protection envelope rearwardly allowing the rearward portion of the backpack assembly to extend rearwardly out of the cylindrical component protection envelope defined by the maximum deflection radius of the wheels. In embodiments, the component protection envelope can be adjusted rearwardly by swapping out tails of different rigidity, or lateral flexibility, or length, or physical configuration. Alternatively, the component protection envelope can be adjusted rearwardly by adding an additional tail. Similar to the wheels, each tail having a maximum deformation limit which provides a minimal distance from the chassis that the tail will extend in deformation upon impact with a surface. The component protection envelope defined by the geometric space about the robot that a flat surface that is impacted by the robot in all different impact orientations, will not intrude. A generally rigid tail will provide a component protection envelope that extends from a deformation radius of each wheel, taken at the outermost portion of the wheel at that radius, to the full length of the tail.

A feature and advantage of embodiments is an L-shaped integral accessory backpack assembly that is attached to both a top wall and a back wall of the chassis providing a highly robust connection that even if there is an impact on the backpack assembly, the integrity of the connection is maintained. In embodiments, the L-shaped integral accessory backpack assembly comprises a backpack unit that is attachable and removable to the back wall of the chassis with one degree of freedom, an operational unit is attached to the top wall and also attached to the backpack unit thereby providing an integrated L-shaped backpack accessory assembly.

In embodiments, the integral backpack assembly comprises a hermetically sealed backpack unit and a hermetically sealed operational top wall mounted unit. In embodiments, the backpack unit and the operation top wall mounted unit are electrically connected by a cable. In embodiments, the backpack unit is electrically connected to the robot. In embodiments, when the backpack unit is electrically connected to the robot, a port on the accessory can receiving charging power for charging the robot batteries.

The accessory interfaces may be utilized for mounting accessories such as sensor devices, munitions, communication hardware, illumination devices, gas dispensing devices, or devices with other functionalities. The accessory may be operated remotely by way of a remote controller that operates the robot. Communications circuitry and operational circuitry may be separate from or included in the remote controller that operates the robot. In embodiments, the accessories have a cooperating robot interface allowing the accessory to be attached directly to, or by way of an intermediate bracket, to the accessory interface of the robot. The accessory having surfaces that abut with the planar landing surface and surfaces that engage the chassis in the landing recesses or on the landing sidewall surfaces. Such an arrangement minimizes transfer of impact forces to fasteners attaching the accessory to the robot. In embodiments, the backpack units as described herein may be mounted on the topside and/or the backside of the elongate body of the two wheeled throwable robot.

As described herein, accessories are attached to throwable robots used in military and policing operations with the robot and attached accessory maintaining essentially the same robustness and the survivability of the robot without the mounted accessory thereby allowing the robot and attached accessory to survive exposure to rugged conditions including exposure to dirt and water and large vertical drops. As described herein, accessories attached to throwable robots provide modularity, flexibility, and interchangeability allowing a single robot to be reconfigured to meet certain mission specific needs.

DESCRIPTION OF THE DRAWINGS

FIG. 10A is a perspective view of a robot chassis with a backpack component attached thereto.

FIG. 10B is a perspective exploded view of a backpack component and the chassis of FIG. 10A showing cooperating interface portions.

FIG. 20 is a perspective view of another backpack unit with an LED unit attached thereto.

FIG. 21 is a perspective view of the backpack unit of FIG. 20 with two tail interfaces on the rearward side of the backpack unit and two tails attached thereto.

FIG. 22 is a front perspective view of the backpack unit and LED unit of FIGS. 20 and 21.

FIG. 23 is a rear perspective view of the backpack unit and LED unit of FIGS. 20 and 21.

FIG. 25 is a perspective view of a backpack unit and an attached speaker unit.

FIG. 26 is an exploded perspective view of the speaker unit and the backpack of FIG. 25.

DETAILED DESCRIPTION

Figure 1:
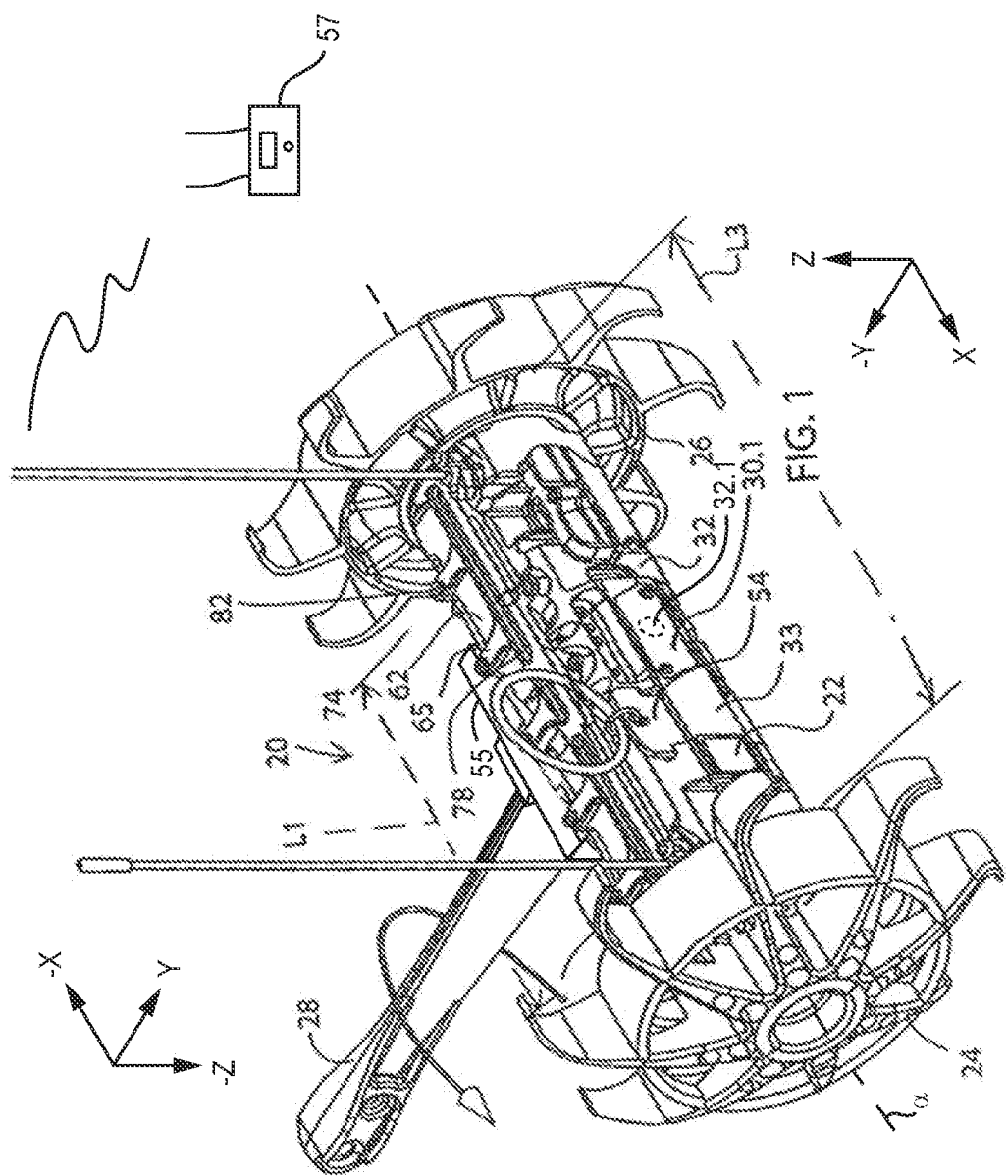
FIG. 1 is a front perspective view of a throwable robot according to embodiments.

Referring to FIGS. 1-9, a throwable two wheeled robot 20 that generally comprises an elongate body 22, a pair of motorized wheels 24, 26, and a tail 28 centrally positioned between the wheels. The elongate body defining a chassis 32 for supporting componentry, such as a camera 32.1, and having a forward side 30.1, a rearward side 30.2, a top side 30.3, and a bottom side 30.4. The chassis 32, in embodiments, may be comprised of a pair of clam shell portions 33, 34. A seal ring 35 may provide sealing. One portion, a rear portion, having a deep recess 38 and the other a shallow recess 40. The chassis defining an interior 40 that contains a pair of motors 44, batteries, 48 and a circuit board 50. The robot may be actuated by withdrawing a key 53 from a key slot 54. The robot having an axis a extending through the rotational axis of the wheels and through the elongate body 22. The robot is remotely controlled by radio from a user interface 57. FIGS. 1-4 illustrate a backpack accessory mounted on the rearward side 30.2 with the tail 28 mounted on the backpack accessory 55.

Referring to FIGS. 1, 2, and 4-7, details of an exterior surface 58 of the chassis 32 are illustrated providing accessory mounting interfaces 62, 63, one on the top side of the body and one on the rear side of the body. The interface surfaces each comprising a projection 65 that has a landing 66 with a planar landing surface 68, one or more threaded holes 70 extending from the planar landing surface 68, and landing sidewall portions 71 with landing sidewall surfaces 74. The landings may also have recesses 78 with chassis wall surfaces 79 defining the recesses. The holes defining a matrixical arrangement 82 of the holes having a length L1 that more than half (most of) the length L2 of the elongate body portion and more than half (most of) the distance between the wheels L3. In embodiments, there will be a line of threaded holes spaced about 1.0 inches apart in the direction of an axis of the elongate body. Additionally, holes will be spaced 1.0 inches from each other in a direction perpendicular to the line of holes parallel to the elongate body axis. In embodiments, particularly where the backpack accessory 55 is in the zone of protection provided by the maximum deflection of the wheels and/or the deflection resistance of the tail, as illustrated by FIGS. 1-5, the interface of the backpack accessory may be essentially planar, as best shown in FIG. 3 without the cooperating projection and recess structure described. FIG. 67 illustrates the planar seating surface 83 and the seating region 84 for the backpack accessory 55 as illustrated in FIGS. 1-5.

Figure 5:
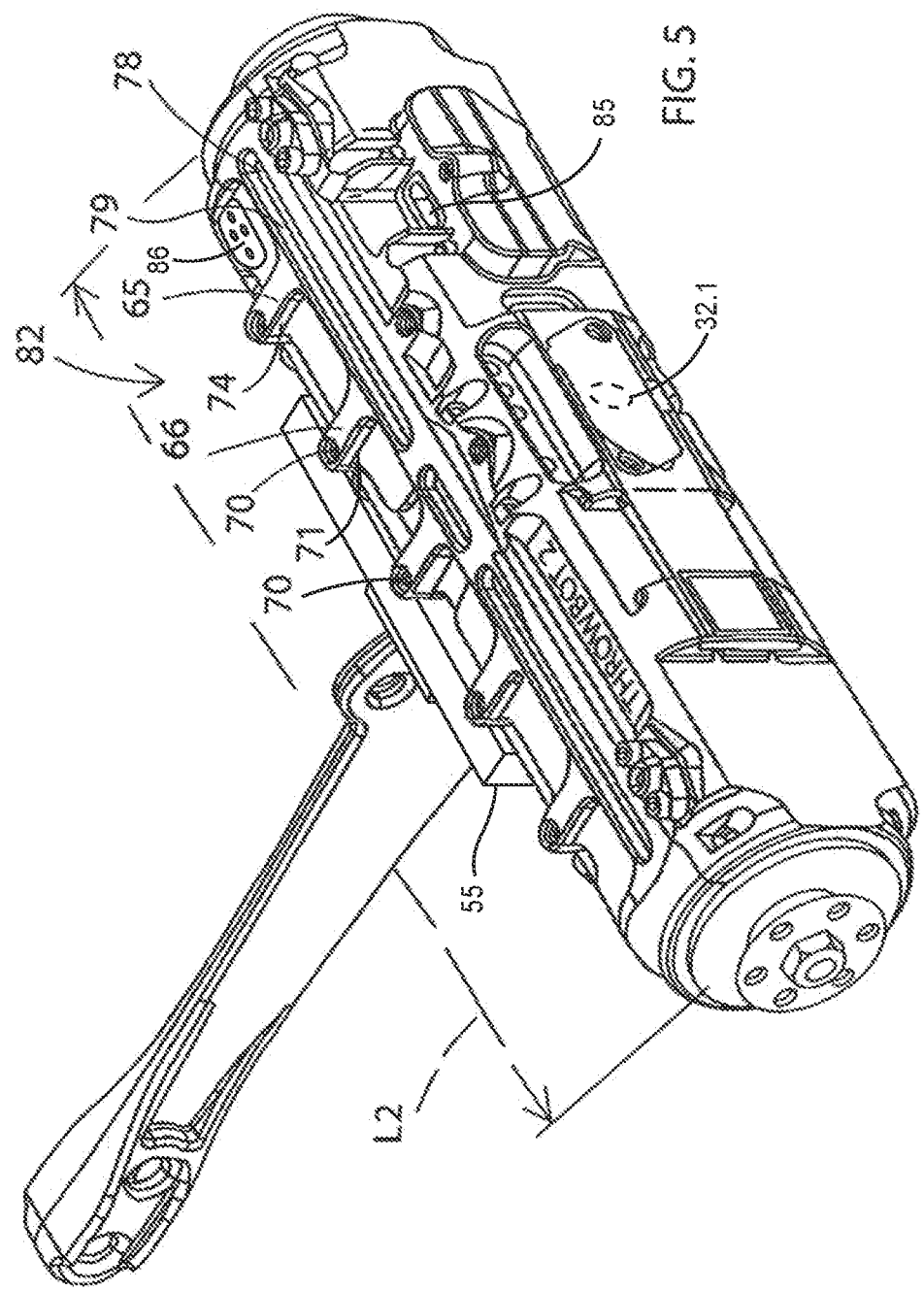
FIG. 5 is a perspective view of the body of FIG. 4.
Figure 6:
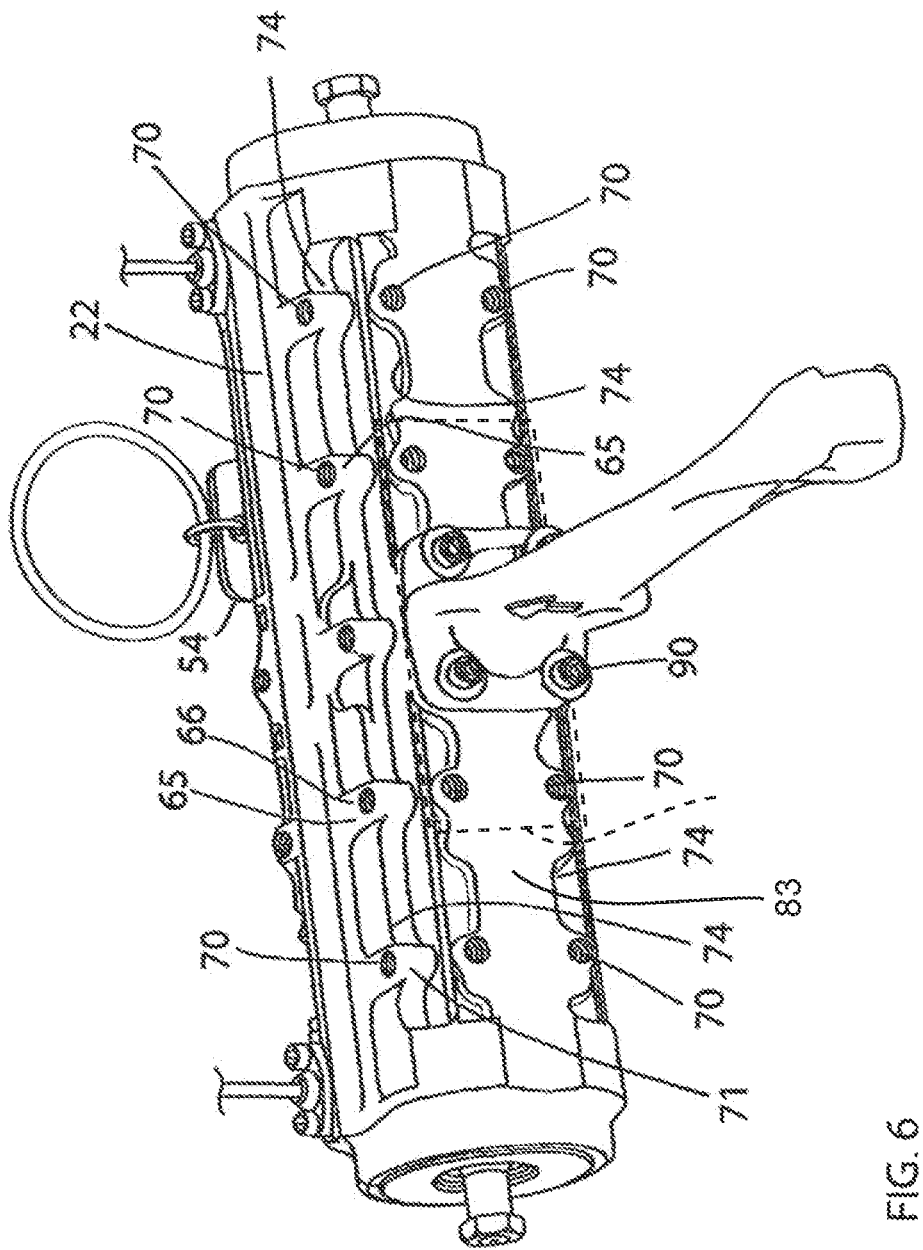
FIG. 6 is a rear perspective view of a body according to embodiments.

Referring to FIG. 5, the elongate body 22 of the robot may provide a power supply port 85, such as a USB port, for providing power to the backpack accessory. In embodiment, the housing may also have a pogo connector pad 86 for providing power to the backpack accessory. In embodiments, the power supply port may also be a charging port for the robot 20.

Figure 7:
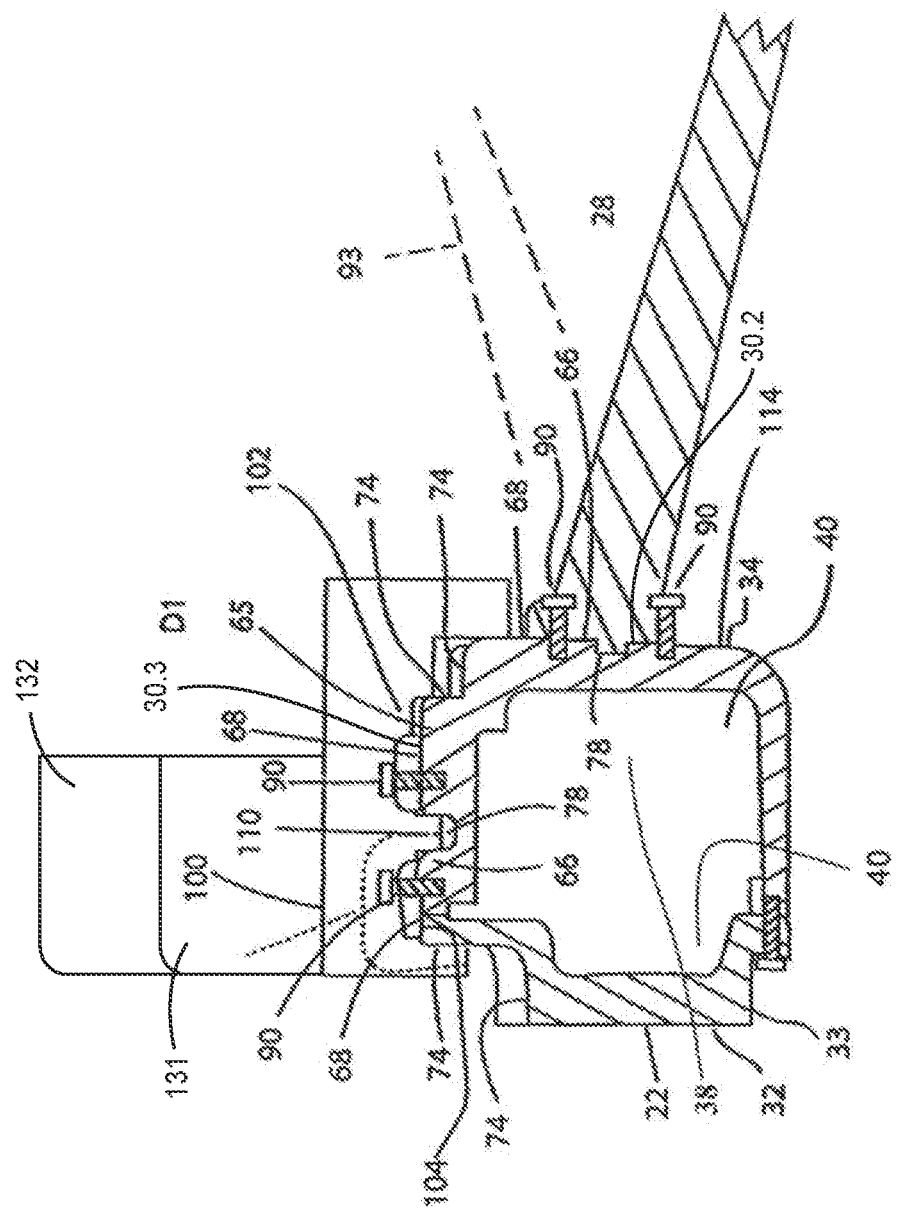
FIG. 7 is a cross sectional view of a robot showing the attachment of an accessory.
Figure 8:
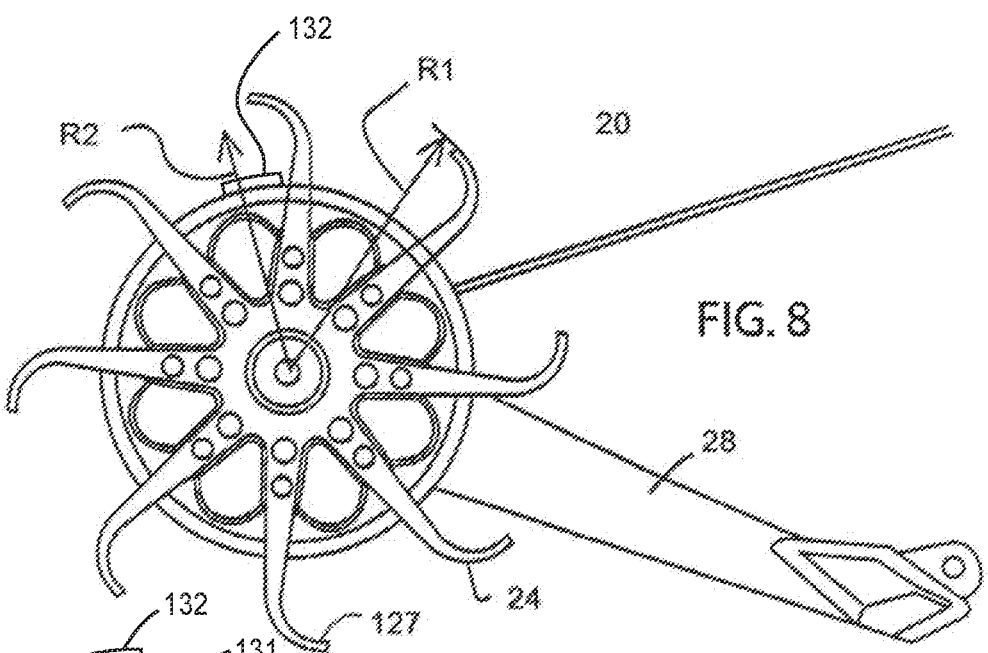
FIG. 8 is an end elevational view of a robot showing the undeformed radius of wheels and the deformed radius under impact conditions.
Figure 9:
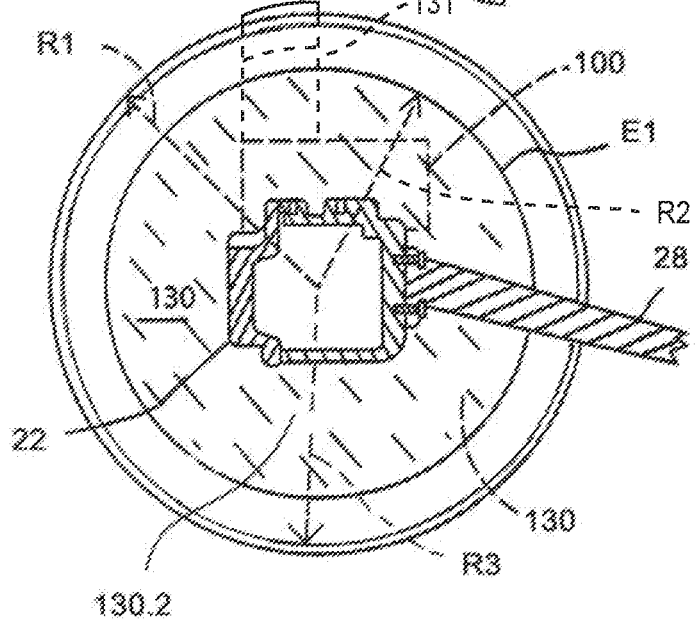
FIG. 9 illustrates the accessory mounting region defined by the body and the component protection envelope defined by the maximum deformed radius of the wheel.
Figure 11A:
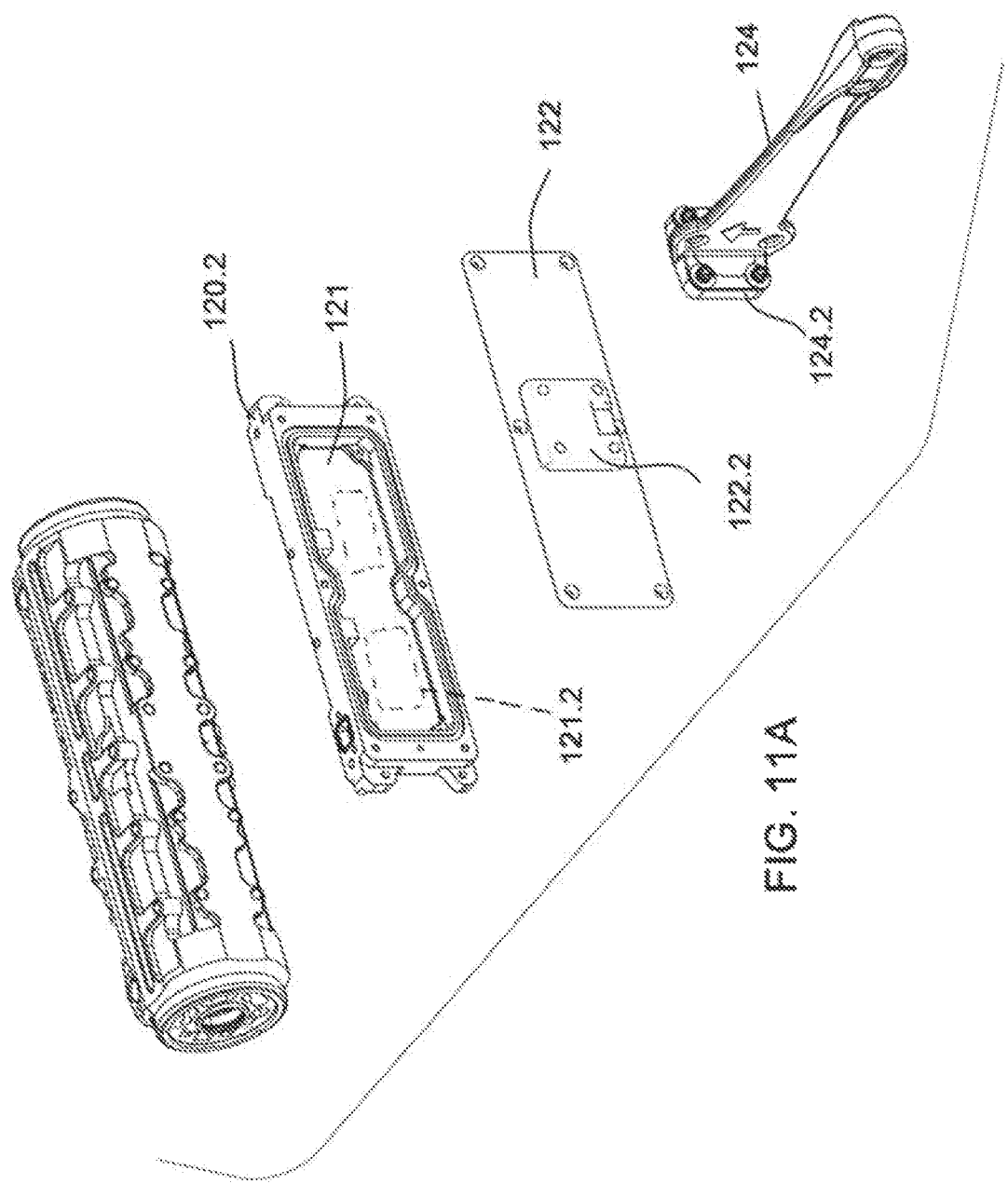
FIG. 11A is an exploded backside view of the backpack unit and robot chassis of FIG. 10A.
Figure 11B:
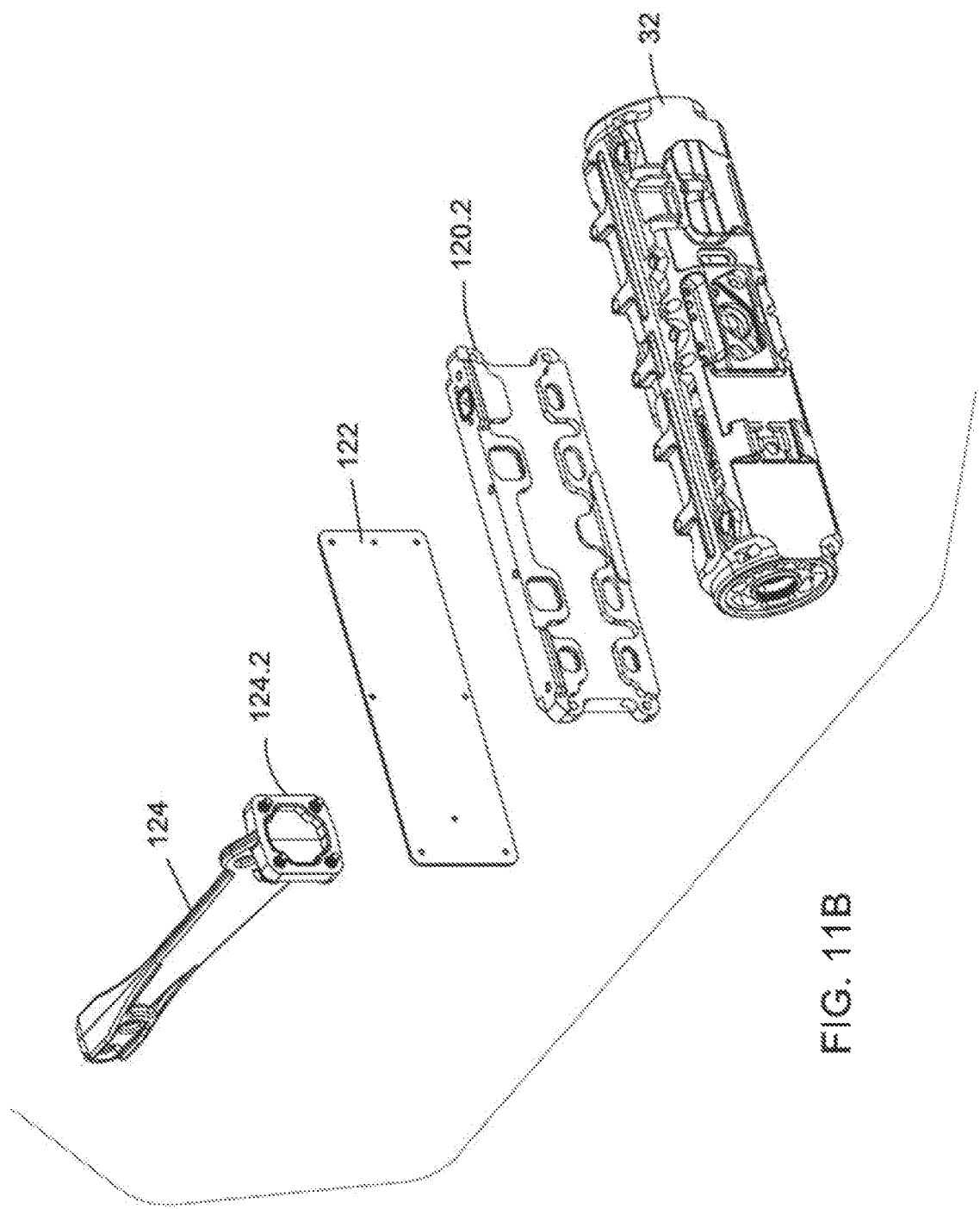
FIG. 11B is an exploded front side view of the backpack unit and robot chassis of FIG. 10A.
Figure 13:
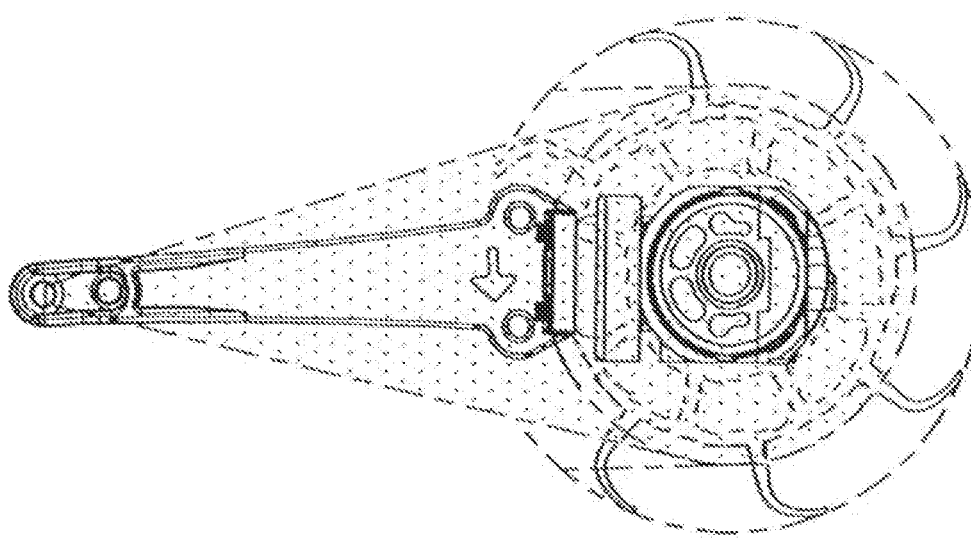
FIG. 13 is an end elevational view of the robot of FIG. 12 with a wheel removed for illustrative purposes showing the component protection envelope.
Figure 12:
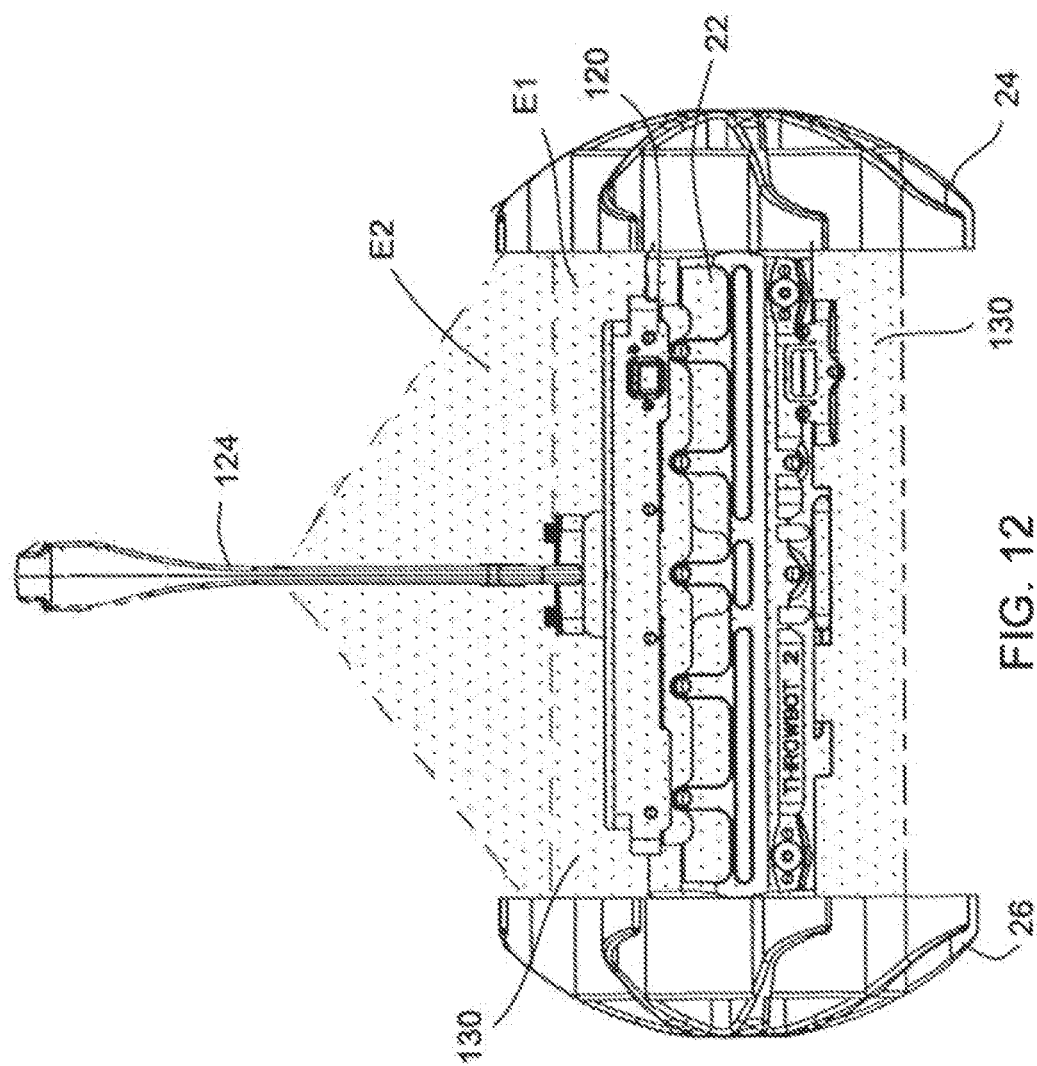
FIG. 12 is an elevational view of a robot with a tail showing a component protection envelope.

Referring to FIGS. 7-9, illustrates a backpack accessory attached to the topside 30.3 of the elongate body. As illustrated, in embodiments, the tail may be attached to the rearward side 30.2 by selected ones of one of the matrixical arrangements of the threaded holes at a landing 77 by way of threaded fasteners such as screws 90 and may be rotated 180 degrees to put the tail at a different position indicated by the dashed lines labeled 93. Another embodiment of a backpack accessory 100 may be attached to the chassis by a robot mounting interface 102 that includes surfaces 104 that abut the outwardly facing planar surfaces of the landing 66. Projections 110 may fit into one of the recesses 78. The accessory may wrap around and engage the rearward facing surface 114 of the rearward side of the chassis. The abutment of the accessory along surfaces that extend in the same direction as the axis 120 of the screws 90 allow the accessory to chassis interfaces to absorb shock that occurs upon impact after throwing the robot, rather than the screws. The arrangement of FIG. 7 provides, when the screws 90 are not connected, a one degree of freedom of movement, essentially moving the accessory in the direction D1.

The robot mounting interface of the accessory configured to cooperate with the accessory mounting interface of the robot chassis for providing the single degree of freedom of movement when the accessory is placed on the robot chassis for attachment thereto. The one degree of freedom may be provided by a C-shaped portion 123 as indicated by the dotted lines of FIG. 7. The portions of the C-shape portion corresponding to the upper and lower legs of a C may extend on opposite sides of a landing, or more generally a projection, providing protection from the screw shearing off or coming out of the threaded hole. Although FIG. 7 is in two dimensions, as can be seen from the perspective figures the mounting structure of the chassis is in three dimensions.

Referring to FIGS. 8 and 9, in embodiments, the wheels have an undeformed or undeflected radius R1 and a maximum deformed radius condition that occurs under shock, such as upon impact when the robot is thrown or dropped to take the wheel to a maximum deflected radius R2. The radius R2 defining a cylindrical envelope E1. In operation, the wheels may slightly deform from the weight of the robot to an operational deflected radius R3, such as by tips 127 of the wheels slightly bending upon engagement with the floor or ground or other operational surface. The component protection envelope E1 is reflective of the maximum deflection expected of the wheels under normal impact conditions. The space between the envelope E1 and the body or chassis 32 defining the zone of protection or accessory mounting region 130. The sizing of the accessory 100 may within the accessory mounting region 130 thereby protecting the accessory from impact when throwing the robot with attached accessory. As illustrated in FIGS. 7-9, the accessory may have a projecting portion 131 that extends beyond the zone of protection. In such an instance, impact with the accessory when the robot is thrown, can damage the accessory and/or the robot. An elastomeric bumper 132 may be installed on the projecting end of the accessory or other convenient location such that impact when thrown will most likely be at the elastomeric bumper 132 rather than with a non-resilient accessory housing or component.

The accessory may be a sensor device, a munition, communication hardware, illumination device, gas dispensing device, or devices with other functionalities. The accessory may be powered by the robot or may have its own power source. The accessory may have its own communications module for communicating with a remote operator or may utilize communications provided by the robot. In embodiments, the accessory mounting region 130.2 below the chassis is not utilized thereby providing clearance for obstacles such as rocks during forward movement of the robot.

Referring to FIGS. 10A-13, in embodiments, a combination throwable two wheeled robot and backpack unit includes a backpack unit 120 coupled to a robot chassis 32. For purposes of clarity of illustration, the wheels are removed from the robot in FIGS. 10A-11B. The robot 20 generally comprises an elongate body 22 and a pair of motorized wheels 24, 26. The backpack unit 120 may be mountable on the chassis 32 of the robot 20 using cooperating interfaces 118, 119. One interface 118 is configured as an elongate projection 118.1 with serpentine edges 118.2 and the other interface 119 has a recess 119.1 with serpentine edges 119.2. The interfaces are conformingly shaped for providing a single freedom of movement for placement and removal of the backpack unit on the chassis. In embodiments, the backpack unit 120 has a backpack body 120.2 that defines a cavity 121 with backpack componentry 121.2, such as circuitry, and control processors, radios, such as recievers or transceivers, and memory, and that is coverable by a cover 122. The robot includes a tail 124 having a mounting portion configured as a flange 124.2 that is mountable to either a landing portion 122.2 of the cover 122 or a landing portion 32.2 of the robot chassis 32. In embodiments, when the backpack unit is placed on the robot without threaded fasteners attaching the backpack unit to the robot, the backpack unit has one degree of freedom of motion relative to robot, the one degree of freedom allowing the backpack unit to be pulled outwardly away from the robot. In embodiments, the direction of removal is transverse to the axis of the elongate body. In embodiments, the direction of removal is perpendicular to the longest axis of the elongate body. In embodiments, the direction of removal is perpendicular to a rotational axis of the robot wheels.

Figure 15:
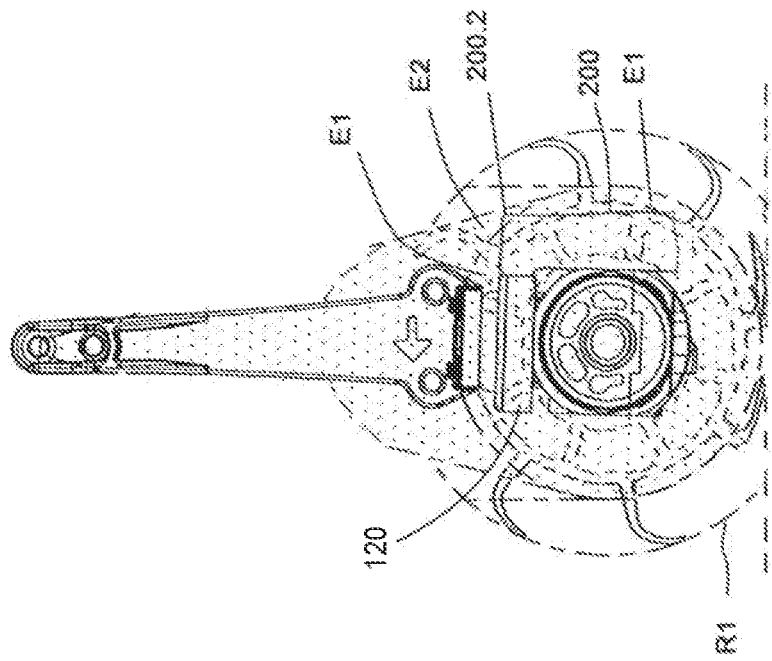
FIG. 15 is an end elevational view of the robot of FIGS. 12 and 13 with a wheel removed for illustrative purposes in an impact condition with a flat surface showing the wheels in a maximum deflection state.
Figure 14:
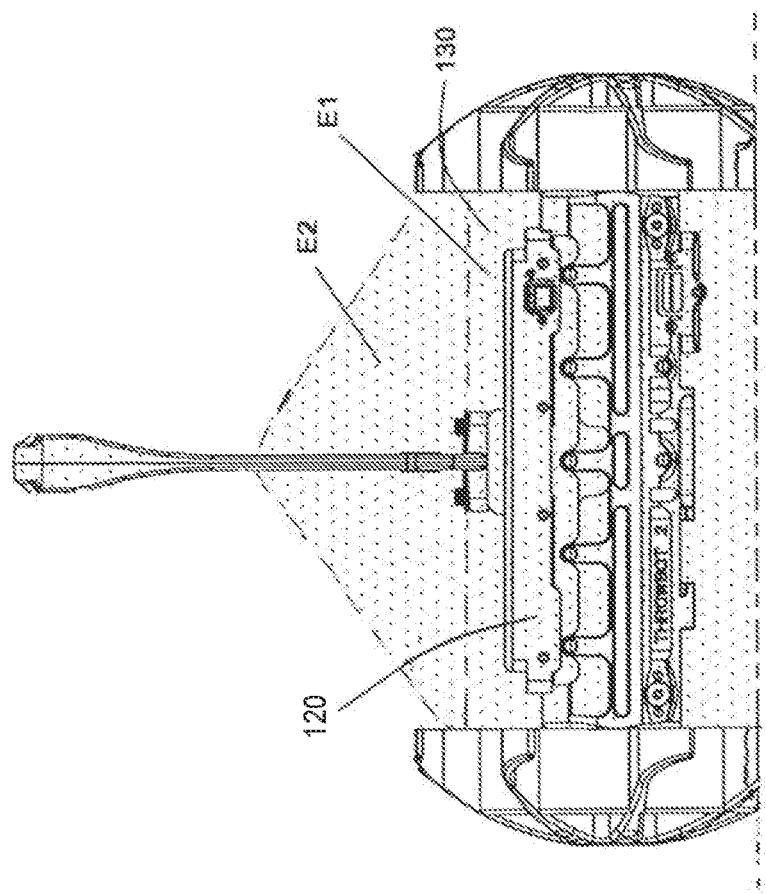
FIG. 14 is an elevational view of the robot of FIG. 12 in an impact condition with a flat surface showing the wheels in a maximum deflection state.
Figure 17:
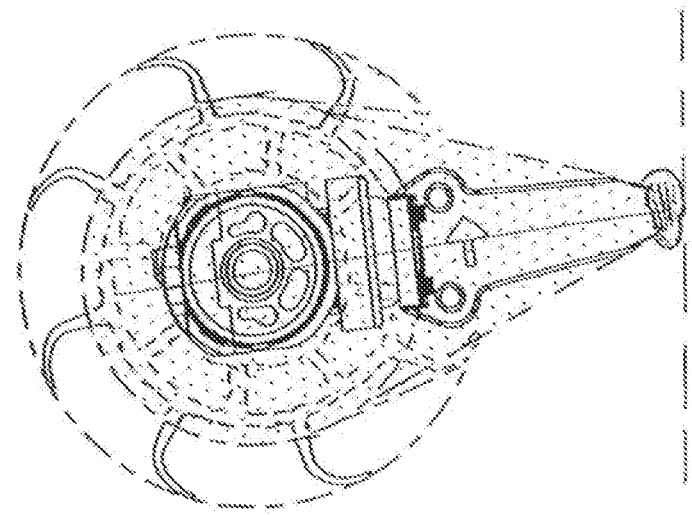
FIG. 17 is an end elevational view of the robot of FIGS. 12 and 13 with a wheel removed for illustrative purposes in an impact condition with a flat surface on the back side of the robot illustrating the expanded component protection envelope provided by the tail.
Figure 16:
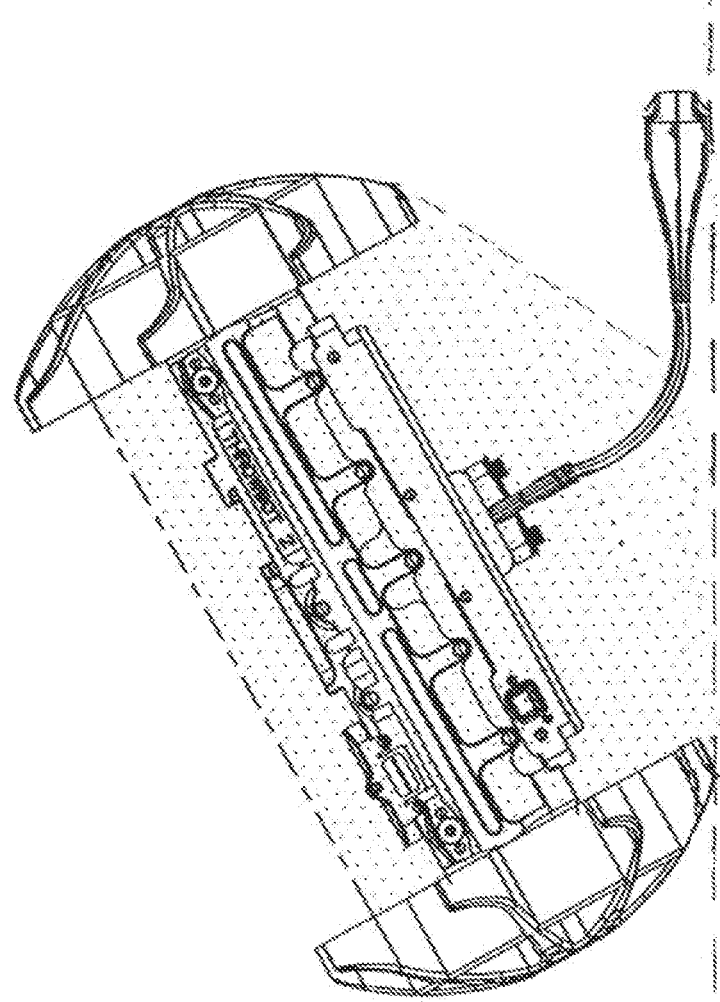
FIG. 16 is an elevational view of the robot of FIGS. 12 and 13 in an impact condition with a flat surface on the back side of the robot illustrating the expanded component protection envelope provided by the tail.

Referring to FIGS. 12-16, and as discussed with reference to FIG. 9 above, in embodiments, each of the wheels 24, 26 have an undeflected radius R1, and each wheel is deformable upon impact when thrown to a maximum deformed radius R2. In embodiments, the maximum deformed radius defines a cylindrical component protection envelope E1 extending between the wheels and the space between the elongate body and the cylindrical envelope defines an annular accessory mounting space 130. In embodiments, the backpack unit 120 is entirely within the annular accessory mounting space when the robot interfacing portion of the backpack body is mated with the landing portion of the chassis and the tail interfacing portion of the backpack body is mated with mounting portion of the tail. The backpack body extends rearwardly from the robot chassis and the tail extends rearwardly from the cover of the backpack. In embodiments, the tail provides an additional component protection envelope E2 continuous with the accessory mounting space as best illustrated in FIGS. 16 and 17. The rigidity of the tail can be tailored to adjust the size of the additional component protection envelope E2.

Referring to FIGS. 15-27, in embodiments, the backpack unit may be attached to an additional operational unit 200 for providing components/sensors for selected functionality, including but not limited to TDS (Distraction/Gas/Explosives), speakers, cameras (thermal, backup, etc), CBRNE sensors, flashlights/strobe lights, microphone arrays, motion sensors/range finders, various actuators (e.g., actuators that pick up objects and actuators that release a payload), various radios, and explosives such as Thermite. The operational unit 200 may be secured to both the top wall of the robot and to the backpack unit. Referring to FIG. 15, the operational unit is illustrated as having a portion 200.2 that extends out of the cylindrical component protection envelope E1 but is still contained within the tail extended component protection envelope E2.

Flashbang type munitions that may be suitable to be used as part of the backpack, some requiring modified actuation mechanisms are, for example U.S. Patents and Pat. Pubs. U.S. Pat. Nos. 10,494,314; 10,139,203; 9,726,466; 8,172,966; 2020/0333119; and 2008/0006171. These patents and patent publications are incorporated herein by reference for all purposes.

Figures 18, 19:
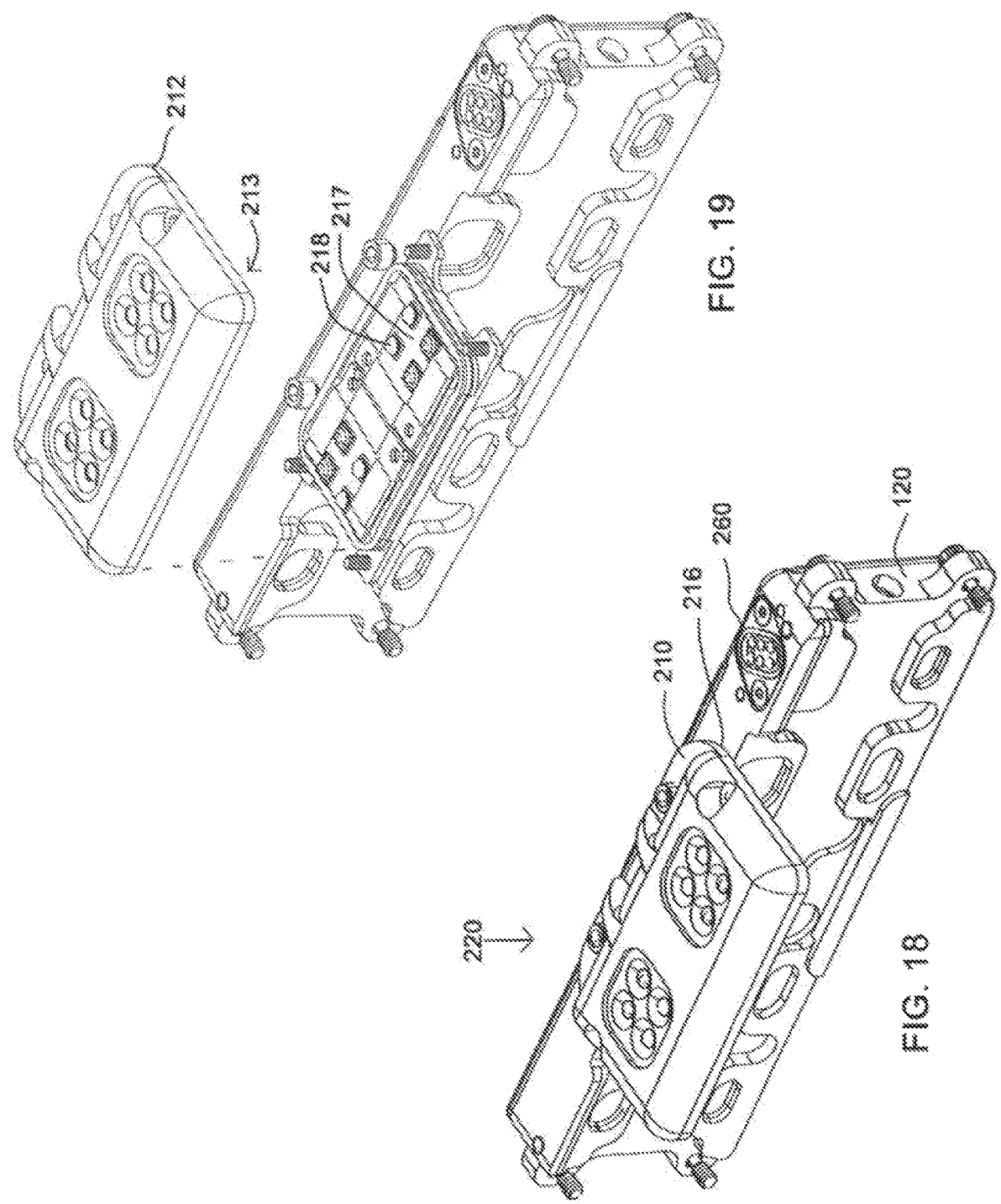
FIG. 18 is a perspective view of a backpack unit with an LED illumination/strobe unit attached thereto for mounting on a robot.
FIG. 19 is a perspective view of the backpack unit of FIG. 18 with the top cover removed from the LED unit.

Referring to FIGS. 18-27, various operational units suitable for attachment to the chassis of the robot and the backpack unit 120 are illustrated. FIGS. 18 and 19 illustrate an LED unit 210 with a housing 212 defining a cavity 213, backpack unit interface 216, circuitry with LED's 218. The LED unit 210 is secured to the backpack unit forming an integrated backpack assembly 220. In profile, an end view, the assembly 220 has an L-shape. A cable, not shown, may extend from the LED unit to the backpack unit for powering the unit and otherwise integrating them.

Figure 24:
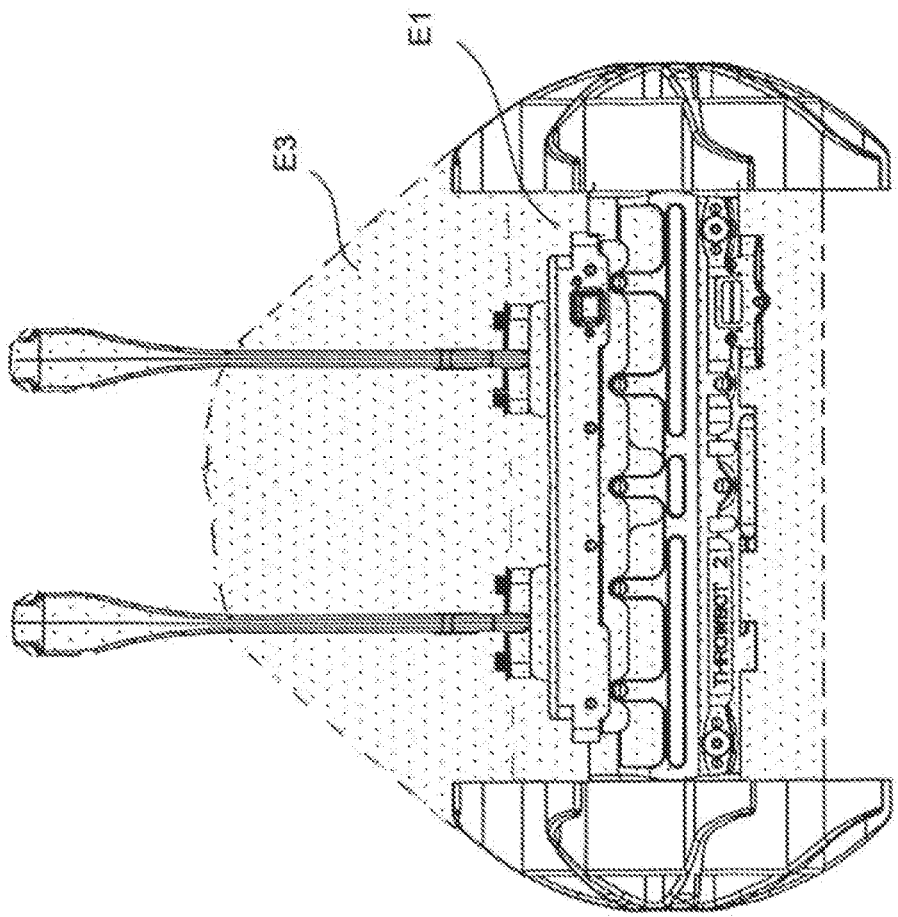
FIG. 24 is a top elevation view of the component protection envelope of the robots and backpack units of FIGS. 18-23.

Referring to FIGS. 20-23, another LED unit 230 is illustrated with a LED orienting portion 232 directing the LED's more forwardly than the embodiment of FIG. 18. The LED unit attaches to the backpack unit 120.8 with screws 233 and extends over the top 235 of the robot and may be attached to the robot by screws 237 extending into select threaded holes of the matrixical arrangement of holes. In the example embodiment of FIG. 21, the backpack unit 120.8 has a plurality of tail mounting interfaces 240, and two of the interfaces are utilized for attachment of two tails 124.8, 124.9. Referring to FIG. 24, utilization of two tails may adjust the component protection envelope E3 provided by the two tails enlarging the component protection envelope relative to the component protection envelope provided by one tail. FIG. 23 illustrates the LED unit 230 protected by elastomeric bumpers 241, 242 that expand the zone of protection beyond that provided by the maximum wheel deflection diameter. The elastomeric bumpers may be attached by fasteners, such as screws, or rivets, or by way of adhesives or other methods known to those skilled in the art.

Referring to FIGS. 25 and 26, a backpack accessory 250 has an inverted L-shape when viewed on end, has a rearward or backside portion 254 and a topside portion 256. The backside portion having a forward facing robot interface surface 257 for mounting on the robot. The topside portion having a lower surface 258 that confronts and may seat or mount on the topside of the robot. In embodiments, the topside portion has components that provides environmental effects or environmental sensing and the back side has housing 260 containing, for example, control circuitry, communications componentry, battery power. The back side may be securely attached to the rearward side 30.2 of the elongate body and has complex interface structure 264 comprising landings 266, recesses 267, and projections 268, that cooperate with corresponding structure on the backside of the elongate body of the robot. Additionally, an attachment region 269 with threaded holes 269.5 is provided for attachment of the tail 28. The topside portion having a chassis 270, configured as a housing that contains operative elements 271, 272 for sensing or effecting the environment into which the robot is thrown. The operative elements may be for example, speakers, munition cartridges, including flashbang cartridges, or sensors. The backpack accessory may have a connector 280, such as a USB connector, for plugging into a power port 85 on the robot, such as shown in FIG. 5. In embodiments, the power port of the two wheeled throwable robot operates as a charging port as well as a power out port. The backpack accessory may have a USB port 282 that allows the robot to be charged when the backpack accessory is mounted on the robot and the power port is utilized by the backpack accessory. That is, the backpack accessory circuitry allows the charging power provided to the accessory port 182 to be provided to the robot charging port 85, as shown in FIG. 5.

Figure 27:
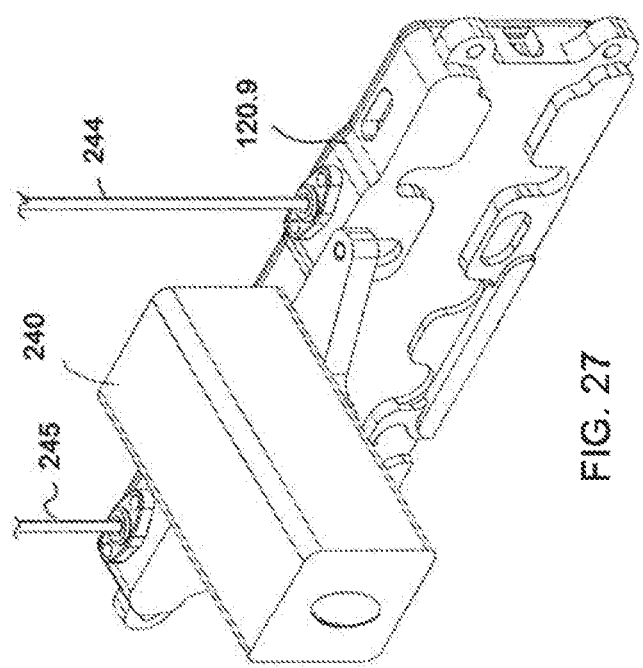
FIG. 27 is a front perspective view of a backpack unit with a heat sensing camera attached thereto.

Referring to FIG. 27, in another embodiment, a thermal imaging camera unit 240 is integrated with the backpack unit and in profile has an L shape. The backpack unit 120.9 is illustrated with a pair of antennas 244, 245. The backpack unit may have a supplemental transmitting and receiving functionality separate from the transmitting and receiving functionality of the robot. In embodiments, the antennas of the backpack unit may replace the antennas of the robot such as the antennas shown in FIG. 1.

In embodiments, the backpack may have mounting holes and an area to route cables for each of the capabilities to be configured in manufacturing. In embodiments, the backpack is attached to robot through four screws and is powered through a USBC cable connected to the charging port on the robot.

In embodiments, the backpack is dimensioned and configured to fit between two wheels of the throwable robot. In embodiments, the backpack/accessory within the standard wheels may be rated to the same 30 foot drop rating as the throwable robot. In embodiments, the drop rating of the backpack/accessory is such that users may use the robot the same way every time whether or not the backpack/accessory is attached to the throwable robot. That is, particular accessory units may be contained within the component protection envelope. In embodiments, the backpack may be used with attachments that are too large to fit within an defined by the wheels and tail of the throwable robot. In such a case, the wheels may be replaced with larger wheels having a greater maximum deformation radius thereby increasing the size of the component protection envelope. Alternatively or additionally, a different or additional tail may be added to increase the envelope rearwardly. In embodiments, "maximal deformation" may be at the intended maximum drop distance. That is, the component protection envelope may be defined by the maximum deformation of the wheels and tail when the robot is dropped from 30 feet.

In embodiments, the backpack and/or accessory may be triggered though an operator control unit (OCU). In embodiments, the OCU has two buttons associated with backpack/accessory capabilities. In embodiments, a pushbutton may be used to trigger a desired action. In embodiments, a pushbutton may be pressed to enable a speaker, microphone, thermal camera, etc. In embodiments, a safety mechanism (e.g., a toggle switch and toggle guard in this case) is associated with a switch used to trigger a desired function. In embodiments, a switch with a safety mechanism is used to arm a TDS attachment.

FIGS. 18 and 19 depict a backpack assembly 120 with POGO pins 260 and mounting structure suitable for particular functional units such as TDS payloads (Distraction/Gas/Explosives), not shown except with respect to the generic unit of FIGS. 9 and 15. With reference to FIG. 15, mounting holes are seen on the top surface and the hole on the top left is used to route cables if needed.

Figure 2:
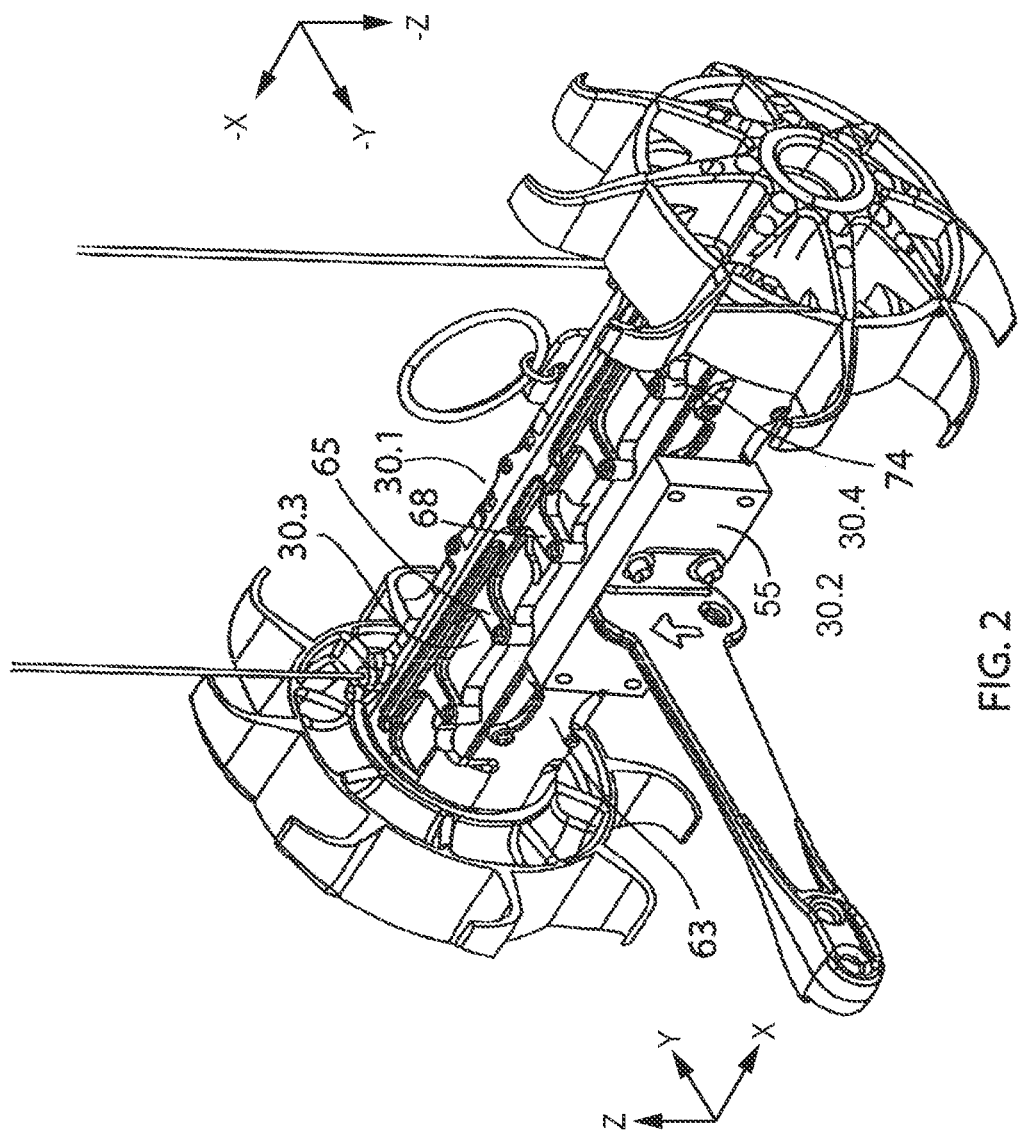
FIG. 2 is a rear perspective view of the throwable robot of FIG. 1.
Figure 3:
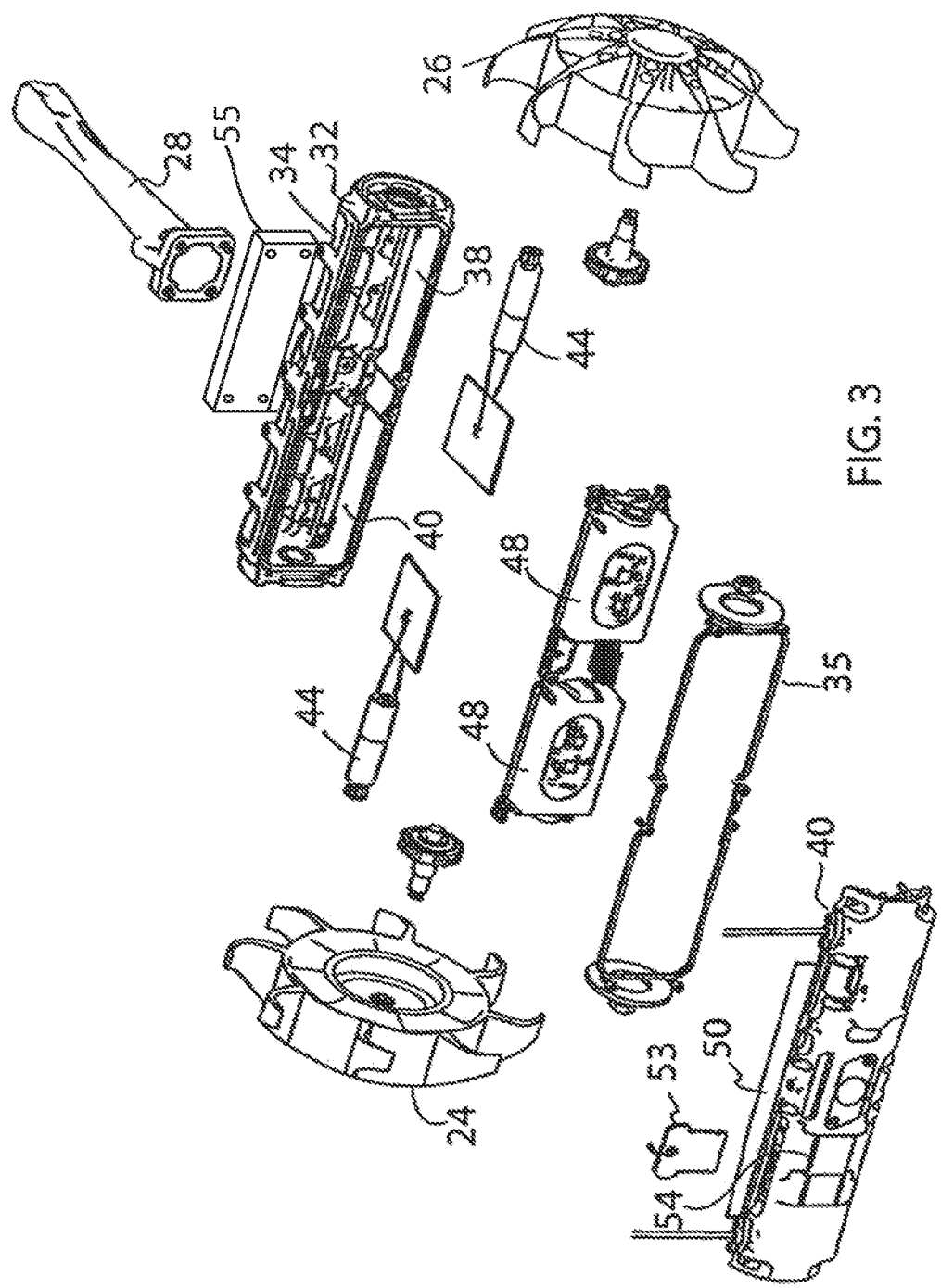
FIG. 3 is an exploded view of a throwable robot according to embodiments.
Figure 4:
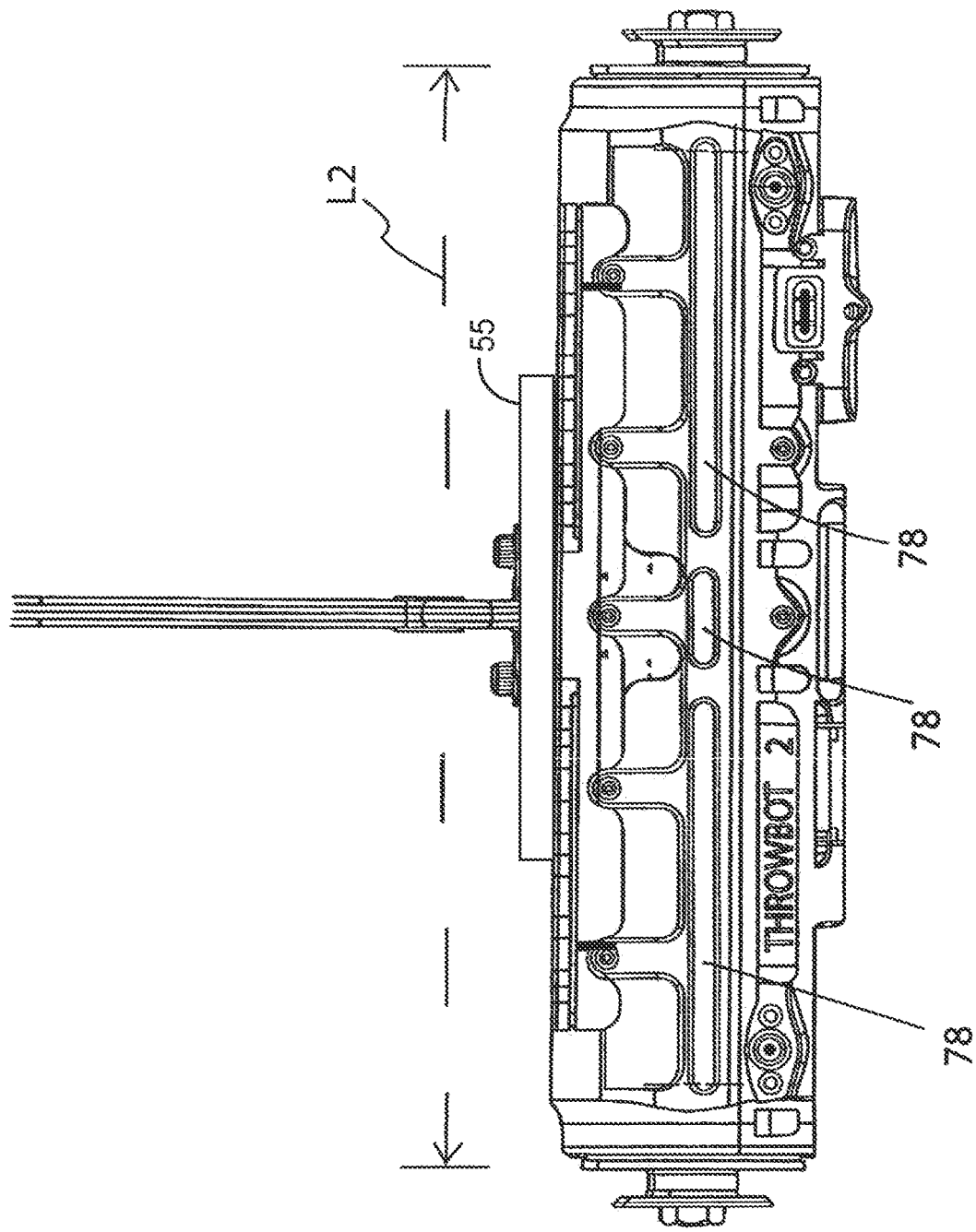
FIG. 4 is top plan view of the body of a robot according to embodiments.

Referring to FIGS. 1 and 2, an upward direction Z and a downward or lower direction –Z are illustrated using arrows labeled "Z" and "–Z," respectively. A forward direction Y and a rearward direction –Y are illustrated using arrows labeled "Y" and "–Y," respectively. A starboard direction X and a port direction –X are illustrated using arrows labeled "X" and "–X," respectively. The directions illustrated using these arrows are applicable to the apparatus shown and discussed throughout this application. The port direction may also be referred to as the portward direction. In one or more embodiments, the upward direction is generally opposite the downward direction. In one or more embodiments, the upward direction and the downward direction are both generally orthogonal to an XY plane defined by the forward direction and the starboard direction. In one or more embodiments, the forward direction is generally opposite the rearward direction. In one or more embodiments, the forward direction and the rearward direction are both generally orthogonal to a ZY plane defined by the upward direction and the starboard direction. In one or more embodiments, the starboard direction is generally opposite the port direction. In one or more embodiments, starboard direction and the port direction are both generally orthogonal to a ZX plane defined by the upward direction and the forward direction. Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," "portwardly," and "starboardly," should not be interpreted to limit the scope of the invention recited in the attached claims.

The following United States patents and publications are hereby incorporated by reference herein: U.S. Pat. Nos. 9,061,544, 6,548,982, 6,502,657, D637,217, and US D626,577, US 2012/0137862 and U.S. Pat. No. 10,046,819. Components illustrated in such patents may be utilized with embodiments herein. Incorporation by reference is discussed, for example, in MPEP section 2163.07(B).

The invention is not restricted to the details of the foregoing embodiment (s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A backpack unit including an accessory removably mounted on a two-wheeled throwable robot, the robot comprising:
    an elongate body with exactly two opposing ends;
    a pair of motorized wheels mounted on each of the two opposing ends of the elongate body, each wheel having an undeflected radius, and each wheel being deflectable upon impact when thrown to a deflected radius, and wherein the deflected radius defines a cylindrical envelope, and wherein the space between the elongate body and the cylindrical envelope defines an annular accessory mounting space and zone of protection;
    the backpack unit including an accessory extending radially outward beyond the cylindrical envelope defining the annular accessory mounting space;
    a bumper extending radially outward with the backpack unit including the accessory, the bumper extending the zone of protection for the backpack unit including the accessory.

2. The backpack unit including the accessory removably mounted on the two-wheeled throwable robot of claim 1, wherein the backpack unit including the accessory extending into an additional protective envelope provided by a tail extending rearwardly.

3. The backpack unit including the accessory removably mounted on the two-wheeled throwable robot of claim 2 wherein the accessory is one of a sensor, munition, communication device, illumination device, and gas dispensing device.

4. A backpack unit mountable on a two wheeled throwable robot, the backpack unit comprising:
    a backpack body including a robot interfacing portion, the backpack body having an inverted L-shape when viewed from an end;
    the robot interfacing portion of the backpack body receives at least one operational unit, the operational unit comprising one of a sensor, munition, communication device, illumination device, and gas dispensing device;
    the backpack body having a length not exceeding 5.75 inches.

5. The backpack unit of claim 4 in combination with the two wheeled throwable robot.

6. The combination of claim 5, wherein each wheel has an undeflected radius, and each wheel may deflect upon impact when thrown to a deflected radius, and wherein the deflected radius defines a cylindrical envelope, and wherein the space between the body and the cylindrical envelope defines an annular accessory mounting space.

7. The combination of claim 6 wherein the backpack unit is entirely within the annular accessory mounting space.

8. The combination of claim 5, wherein a plurality of threaded fasteners are utilized to attach the backpack unit to the robot on a top side and on a rearward side of the chassis.

9. The two wheeled throwable robot in combination with a backpack unit of claim 4, wherein the backpack accessory provides a tail interface and two tails are mounted on the backpack accessory.

10. The two wheeled throwable robot in combination with an backpack unit of claim 4, wherein the accessory backpack assembly comprises a rearward portion attached to a backside of the chassis and an operational unit that is electrically connected to the backpack unit and is positioned above a topside of the robot.

11. The two wheeled throwable robot in combination with a backpack unit of claim 10, wherein the operational unit provides a flashbang and the backpack accessory has a receiver therein.

12. A backpack accessory mountable on a two wheeled throwable robot, the backpack accessory comprising:
    a rearward portion with a forward facing robot interface surface, the rearward portion comprising a housing with circuitry therein, the rearward portion being elongate;
    a topside portion at a topside of the rearward portion and extending forwardly, the topside portion having a chassis that secures a pair of operational components for providing environmental effects, the rearward portion and topside portion configured as an inverted L when viewed from an end.

13. The backpack accessory of claim 12, wherein the backpack accessory includes reloadable flashbang cartridges.

14. The backpack accessory of claim 12, wherein the rearward portion has a rearward facing side with a tail mounting interface thereon, the tail mounting interface including a plurality of holes.

15. The backpack accessory of claim 12, further comprising a power connector for providing the backpack accessory with power from the robot, and wherein the backpack accessory does not have a battery therein.

16. The backpack accessory of claim 15, wherein the backpack accessory further has a power port for receiving power to recharge the robot when the power connector is plugged into a power port of the robot.

17. The backpack accessory of claim 12, wherein there is at least one elastomeric bumper on the topside portion, the elastomeric bumper providing the uppermost surface of the backpack accessory.

18. The backpack accessory of claim 12, further in combination with the two wheeled throwable robot.

19. The combination of claim 18, wherein the robot has an elongate chassis, and a rearward side of the chassis has a matrixical arrangement of threaded holes, none of the threaded holes extending into the interior of the chassis, the matrixical arrangement spanning a distance that is most of a length of the body.

20. The combination of claim 18, wherein each wheel of the two wheeled throwable robot may deflect upon impact when thrown to a deflected radius, and wherein the deflected radius defines a cylindrical envelope, and wherein the space between the body and the cylindrical envelope defines an annular accessory mounting space and wherein the backpack accessory is entirely within the annular accessory mounting space.

\* \* \* \* \*